US011039382B2

(12) United States Patent
Niu et al.

(10) Patent No.: US 11,039,382 B2
(45) Date of Patent: Jun. 15, 2021

(54) EMTC-U MEASUREMENT

(71) Applicant: Apple Inc., Cupertino, CA (US)

(72) Inventors: Huaning Niu, San Jose, CA (US);
Wenting Chang, Beijing (CN);
Anthony Lee, San Diego, CA (US);
Seau S. Lim, Swindon (GB); Salvatore Talarico, Sunnyvale, CA (US); Jinnian Zhang, Madison, WI (US)

(73) Assignee: Apple Inc., Cupertino, CA (US)

( * ) Notice: Subject to any disclaimer, the term of this patent is extended or adjusted under 35 U.S.C. 154(b) by 42 days.

(21) Appl. No.: 16/611,638

(22) PCT Filed: May 23, 2018

(86) PCT No.: PCT/US2018/034171
§ 371 (c)(1),
(2) Date: Nov. 7, 2019

(87) PCT Pub. No.: WO2018/226411
PCT Pub. Date: Dec. 13, 2018

(65) Prior Publication Data
US 2020/0336973 A1 Oct. 22, 2020

Related U.S. Application Data

(60) Provisional application No. 62/516,340, filed on Jun. 7, 2017, provisional application No. 62/516,342, filed on Jun. 7, 2017.

(30) Foreign Application Priority Data

Aug. 1, 2017 (WO) ................ PCT/CN2017/095503

(51) Int. Cl.
*H04W 48/16* (2009.01)
*H04B 1/7156* (2011.01)
(Continued)

(52) U.S. Cl.
CPC .......... *H04W 48/16* (2013.01); *H04B 1/7156* (2013.01); *H04L 5/001* (2013.01);
(Continued)

(58) Field of Classification Search
CPC ............. H04W 48/16; H04W 72/1289; H04W 74/0808; H04B 1/7156;
(Continued)

(56) References Cited

U.S. PATENT DOCUMENTS

2014/0301351 A1* 10/2014 Gao ...................... H04W 74/08
370/329
2016/0278048 A1 9/2016 Nory et al.
(Continued)

FOREIGN PATENT DOCUMENTS

| WO | WO-2016071176 A1 | 5/2016 |
| WO | WO-2016122197 A1 | 8/2016 |
| WO | WO-2016167623 A1 | 10/2016 |

OTHER PUBLICATIONS

"International Application Serial No. PCT/US2018/034171, International Search Report dated Oct. 17, 2018", 3 pgs.

(Continued)

*Primary Examiner* — Peter G Solinsky
(74) *Attorney, Agent, or Firm* — Kowert Hood Munyon Rankin and Goetzel PC

(57) ABSTRACT

Systems and methods of measuring reference signals in a multefire scenario are described. A UE receives control information anchor channel dependent on whether the UE is in an adaptive frequency hopping system (FHS) and whether the FHS is a LBT FHS. The reference signals are received on an unlicensed band via the anchor and/or a non-anchor channel and measured for RRM and/or in-sync or out-of-sync measurements. RRM measurements are transmitted to the eNB for mobility management and otherwise the validity (Continued)

of an in- or out-of-sync indication is determined and a counter started when valid. The control information has a subframe configuration and resource allocation, which is used for SRS transmission on the non-anchor channel. Uplink scheduling information is received on the anchor channel for data transmission on the non-anchor channel based on the SRS.

20 Claims, 16 Drawing Sheets

(51) Int. Cl.
*H04L 5/00* (2006.01)
*H04W 72/12* (2009.01)
*H04W 74/08* (2009.01)

(52) U.S. Cl.
CPC ............ *H04L 5/006* (2013.01); *H04L 5/0053* (2013.01); *H04L 5/0094* (2013.01); *H04W 72/1289* (2013.01); *H04W 74/0808* (2013.01); *H04B 2201/71323* (2013.01)

(58) Field of Classification Search
CPC .......... H04B 2201/71323; H04L 5/001; H04L 5/0053; H04L 5/006; H04L 5/0094
USPC ........................................................ 370/329
See application file for complete search history.

(56) References Cited

U.S. PATENT DOCUMENTS

2018/0110057 A1* 4/2018 Park ..................... H04B 7/0404
2018/0279211 A1* 9/2018 Lunttila ................ H04L 1/1887

OTHER PUBLICATIONS

"International Application Serial No. PCT/US2018/034171, Written Opinion dated Oct. 17, 2018", 7 pgs.

* cited by examiner

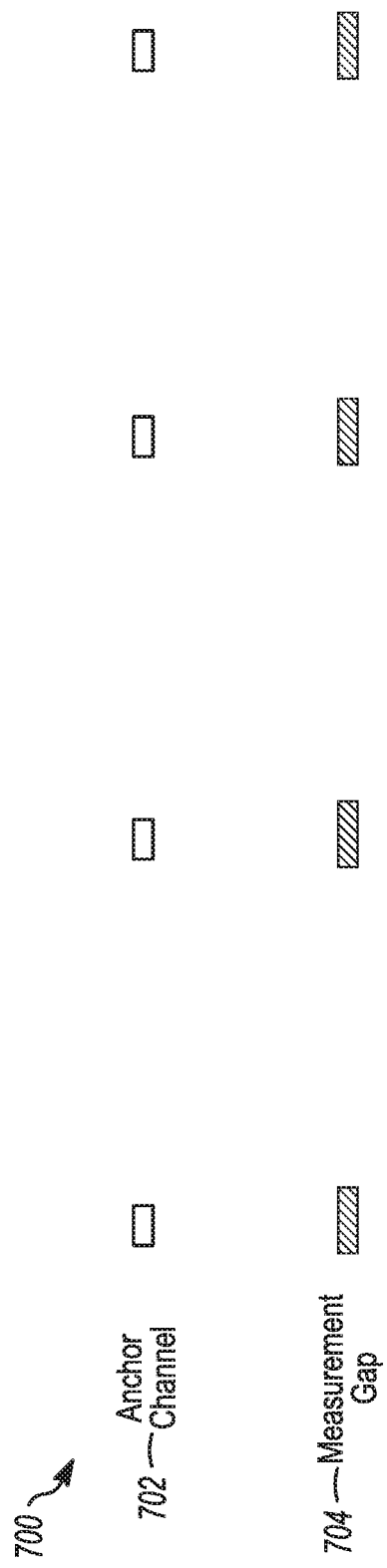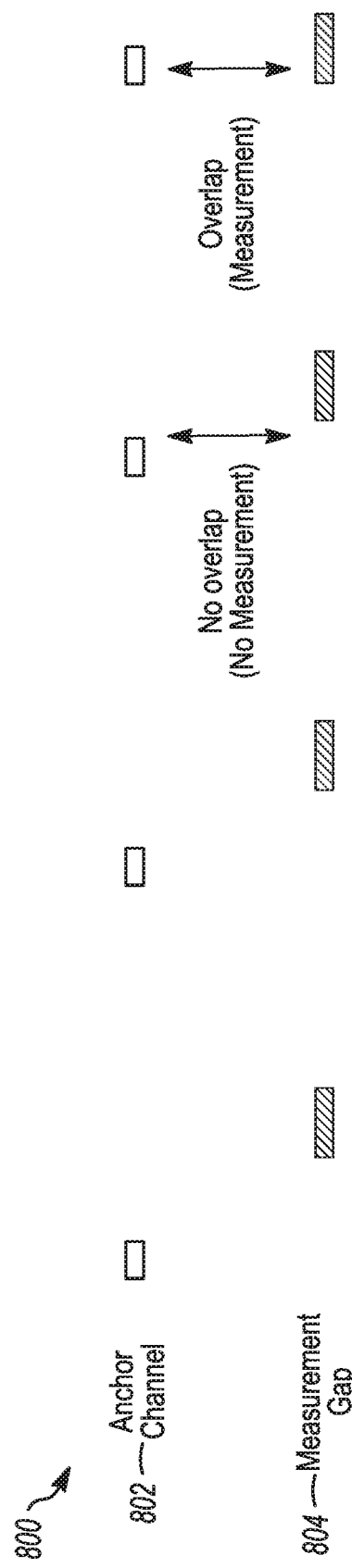

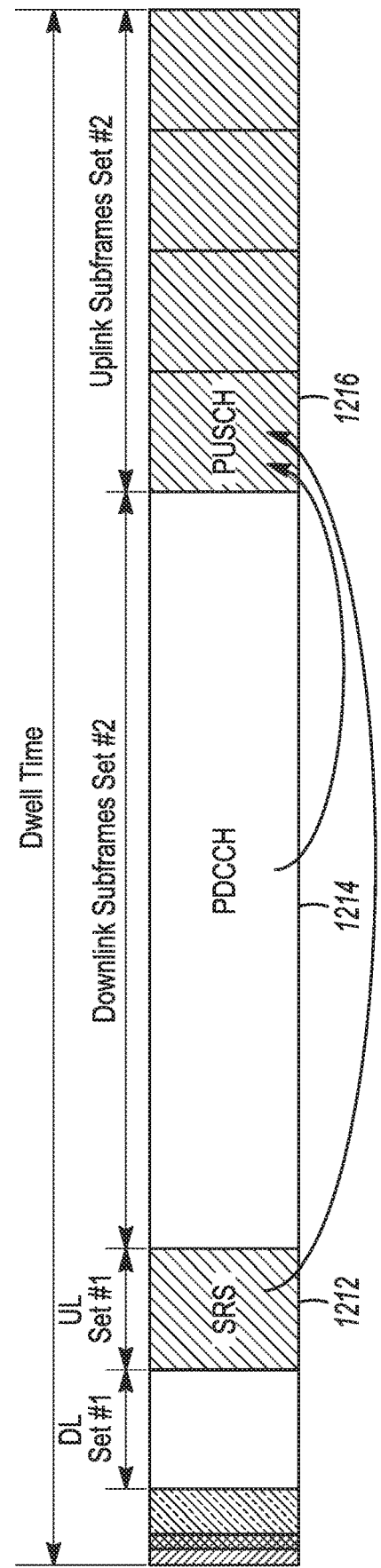
FIG. 12A
FIG. 12B

EMTC-U MEASUREMENT

PRIORITY CLAIM

This application is a U.S. National Stage Filing Under 35 U.S.C. 371 from International Application No. PCT/US2018/034171, filed May 23, 2018 and published in English as WO 2018/226411 on Dec. 13, 2018, which claims the benefit of priority to U.S. Provisional Patent Application Ser. No. 62/516,340, filed Jun. 7, 2017, U.S. Provisional Patent Application Ser. No. 62/516,342, filed Jun. 7, 2017, and International Patent Application PCT/CN2017/095503, filed Aug. 1, 2017, each of which is incorporated herein by reference in its entirety.

TECHNICAL FIELD

Embodiments pertain to radio access networks (RANs). Some embodiments relate to cellular and wireless local area network (WLAN) networks, including Third Generation Partnership Project Long Term Evolution (3GPP LTE) networks and LTE advanced (LTE-A) networks as well as legacy networks, $4^{th}$ generation (4G) networks and $5^{th}$ generation (5G) networks. Some embodiments relate to LTE operation in the unlicensed spectrum using MulteFire, specifically the Internet of Things (IoT) operating in the unlicensed spectrum.

BACKGROUND

The use of 3GPP LTE systems (including LTE and LTE-A systems) has increased due to both an increase in the types of devices user equipment (UEs) using network resources as eell as the amount of data and bandwidth being used by various applications, such as video streaming, operating on these UEs. In particular, typical UEs such as cell phones, as well as enhanced Machine Type Communication (eMTC) UEs and Narrowband Internet of Things (NB-IoT) UEs currently use 3GPP LTE systems. The latter such UEs, may include sensors (e.g., sensing environmental conditions) or microcontrollers in appliances or vending machines. The number of eMTC UEs and NB-IoT UEs in use is expected to increase massively, thus leading to further network development in an attempt to accommodate for the disparate requirements of the different types of UEs and to increase throughput to the UEs. In particular, a number of developments have focused on the use of the unlicensed spectrum to provide additional communication channels with which the eNBs and UEs communicate. However, use of the unlicensed spectrum has led to a variety of issues.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

FIG. 7 illustrates a measurement gap configuration in a synchronous network in accordance with some embodiments.

FIG. 8 illustrates a measurement gap configuration in an asynchronous network in accordance with some embodiments.

FIG. 12A illustrates downlink channel measurement in accordance with some embodiments; FIG. 12B illustrates uplink channel measurement in accordance with some embodiments.

DETAILED DESCRIPTION

Figure 1:
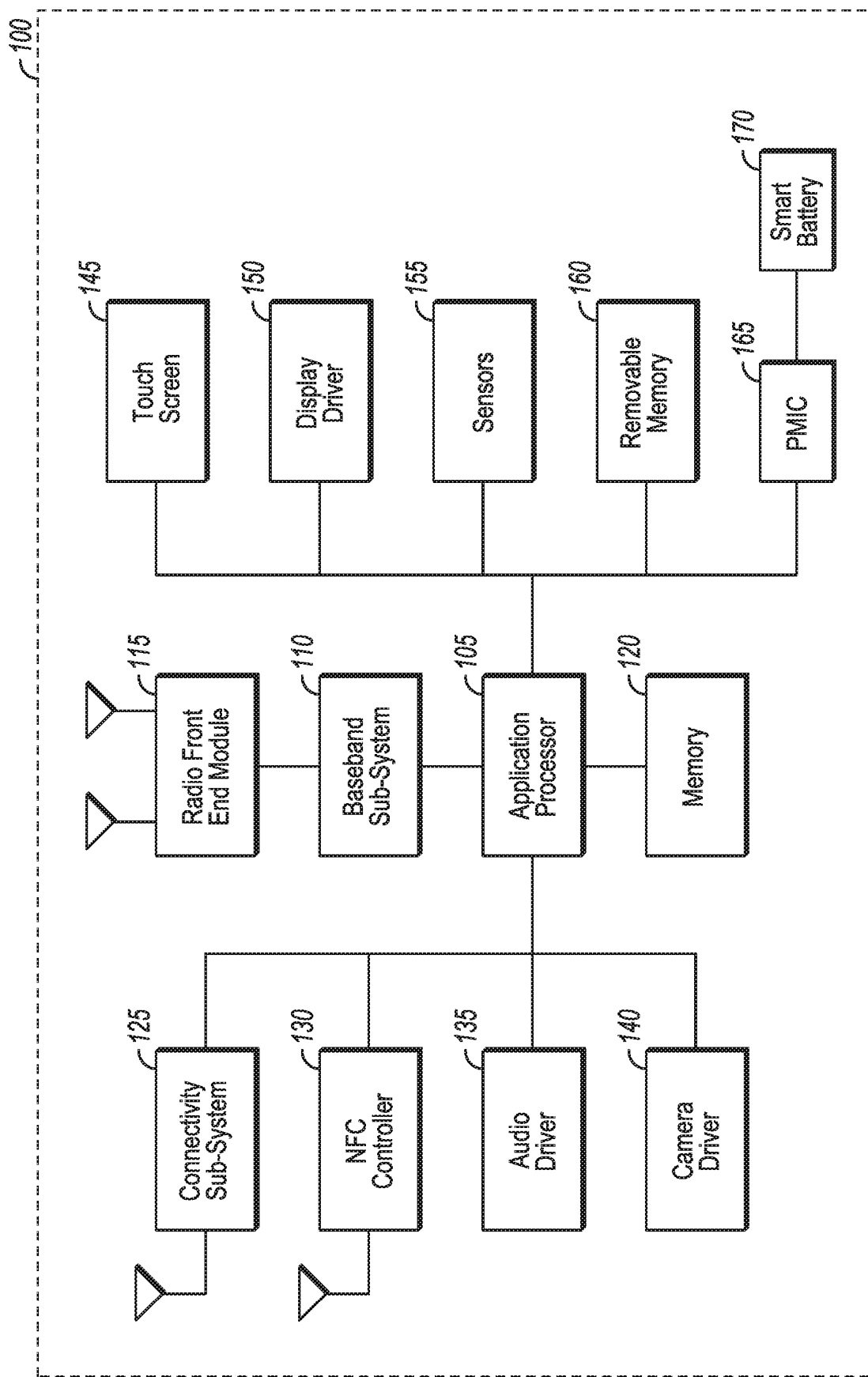
FIG. 1 illustrates a UE in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Any of the radio links described herein may operate according to any one or more of the following exemplary radio communication technologies and/or standards including, but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Tlhird Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MulteFire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"). NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Genenc Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, and the like), technologies operating above 300 GHz and THz bands, (3GPP/LTE based or IEEE 802.11p and other), Vehicle-to-Vehicle (V2V), Vehicle-to-X (V2X). Vehicle-to-Infrastructure (V2I), and Infrastructure-to-Vehicle (I2V) communication technologies, 3GPP cellular V2X, DSRC (Dedicated Short Range Communications) communication systems such as Intelligent-Transport-Systems and others.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz and further frequencies and Spectrum Access System (SAS) in 3.55-3.7 GHz and further frequencies). Applicable exemplary spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, to name a few), IMT-advanced spectrum, IMT-2020 spectrum (expected to include 3600-3800 MHz, 3.5 GHz bands, 700 MHz bands, bands within the 24.25-86 GHz range, for example), spectrum made available under the Federal Communications Commission's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz). WiGig Band 3 (61.56-63.72 GHz), and WiGig Band 4 (63.72-65.88 GHz); the 70.2 GHz-71 GHz band, any band between 65.88 GHz and 71 GHz; bands currently allocated to automotive radar applications such as 76-81 GHz; and future bands including 94-300 GHz and above. Furthermore, the scheme can be used on a secondary basis on bands such as the TV White Space bands (typically below 790 MHz) where in particular the 400 MHz and 700 MHz bands can be employed. Besides cellular applications, specific applications for vertical markets may be addressed, such as PMSE (Program Making and Special Events), medical, health, surgery, automotive, low-latency, drones, and the like.

Aspects described herein can also be applied to different Single Carrier or OFDM flavors (CP-OFDM. SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

FIG. 1 illustrates a UE in accordance with some embodiments. The user device 100 may be a mobile device in some aspects and includes an application processor 105, baseband processor 110 (also referred to as a baseband sub-system), radio front end module (RFEM) 115, memory 120, connectivity sub-system 125, near field communication (NFC) controller 130, audio driver 135, camera driver 140, touch screen 145, display driver 150, sensors 155, removable memory 160, power management integrated circuit (PMIC) 165 and smart battery 170.

In some aspects, application processor 105 may include, for example, one or more CPU cores and one or more of cache memory, low drop-out voltage regulators (LDOs), interrupt controllers, serial interfaces such as serial peripheral interface (SPI), inter-integrated circuit (I²C) or universal programmable serial interface circuit, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband processor 110 may be implemented, for example, as a solder-down substrate including one or more integrated circuits, a single packaged integrated circuit soldered to a main circuit board, and/or a multi-chip module containing two or more integrated circuits.

Figure 2:
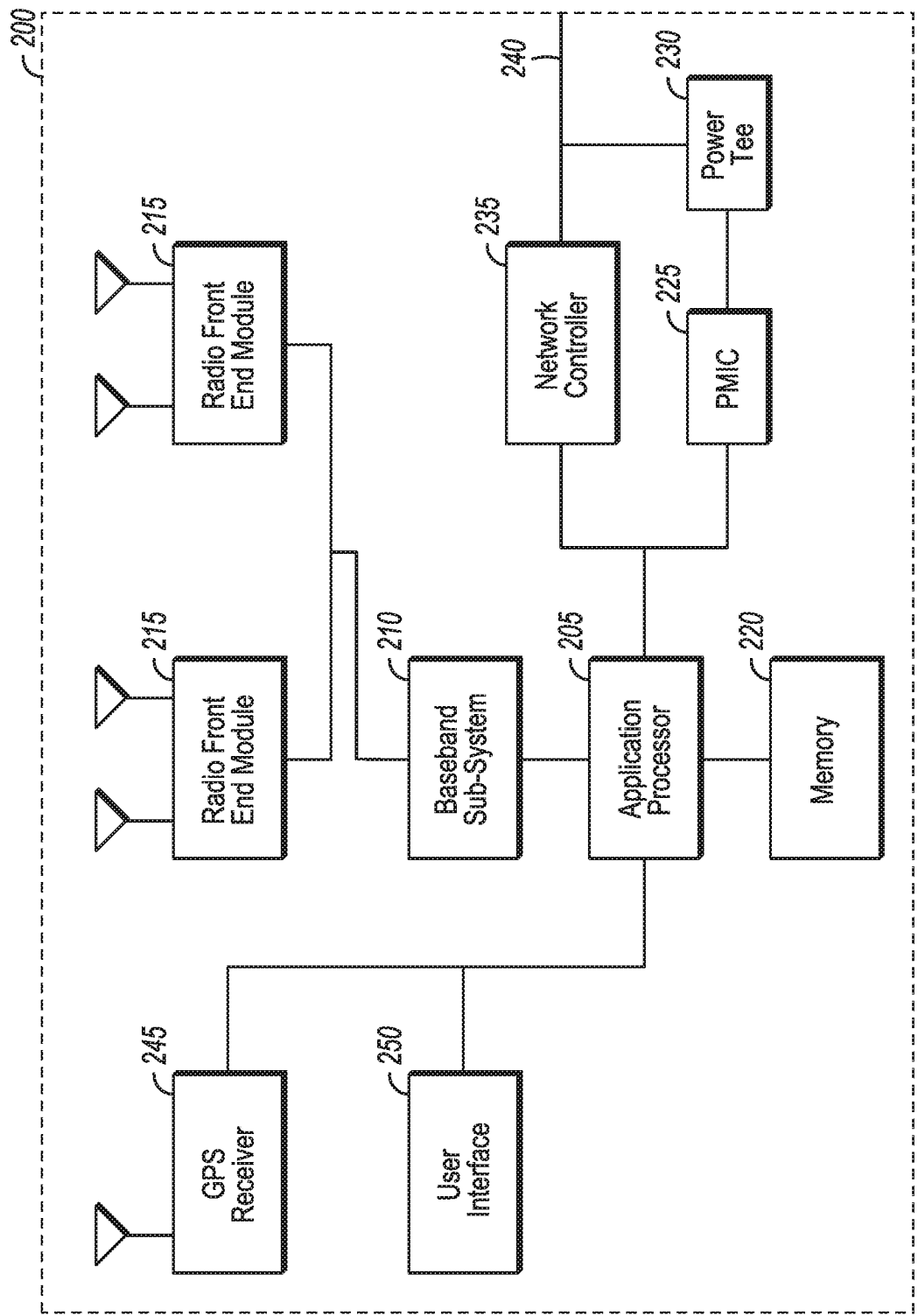
FIG. 2 illustrates a base station or infrastructure equipment radio head in accordance with some embodiments.

FIG. 2 illustrates a base station in accordance with some embodiments. The base station radio head 200 may include one or more of application processor 205, baseband processor 210, one or more radio front end modules 215, memory 220, power management circuitry 225, power tee circuitry 230, network controller 235, network interface connector 240, satellite navigation receiver 245, and user interface 250.

In some aspects, application processor 205 may include one or more CPU cores and one or more of cache memory, low drop-out voltage regulators (LDOs), interrupt controllers, serial interfaces such as SPI I²C or universal programmable serial interface, real time clock (RTC), timer-counters including interval and watchdog timers, general purpose IO, memory card controllers such as SD/MMC or similar. USB interfaces, MIPI interfaces and Joint Test Access Group (JTAG) test access ports.

In some aspects, baseband processor 210 may be implemented, for example, as a solder-down substrate including one or more integrated circuits, a single packaged integrated circuit soldered to a main circuit board or a multi-chip module containing two or more integrated circuits.

In some aspects, memory 220 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM) and/or a three-dimensional crosspoint memory. Memory 220 may be implemented as one or more of solder down packaged integrated circuits, socketed memory modules and plug-in memory cards.

In some aspects, power management integrated circuitry 225 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 230 may provide for electrical power drawn from a network cable to provide both power supply and data connectivity to the base station radio head 200 using a single cable.

In some aspects, network controller 235 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver 245 may include circuitry to receive and decode signals transmitted by one or more navigation satellite constellations such as the global positioning system (GPS). Globalnaya Navigatsionnaya Sputnikovaya Sistema (GLONASS), Galileo and/or BeiDou. The receiver 245 may provide data to application processor 205 which may include one or more of position data or time data. Application processor 205 may use time data to synchronize operations with other radio base stations.

In some aspects, user interface 250 may include one or more of physical or virtual buttons, such as a reset button, one or more indicators such as light emitting diodes (LEDs) and a display screen.

A radio front end module may incorporate a millimeter wave radio front end module (RFEM) and one or more sub-millimeter wave radio frequency integrated circuits (RFIC). In this aspect, the one or more sub-millimeter wave RFICs may be physically separated from a millimeter wave RFEM. The RFICs may include connection to one or more antennas. The RFEM may be connected to multiple antennas. Alternatively both millimeter wave and sub-millimeter wave radio functions may be implemented in the same physical radio front end module. Thus, the RFEM may incorporate both millimeter wave antennas and sub-millimeter wave antennas.

Figure 3:
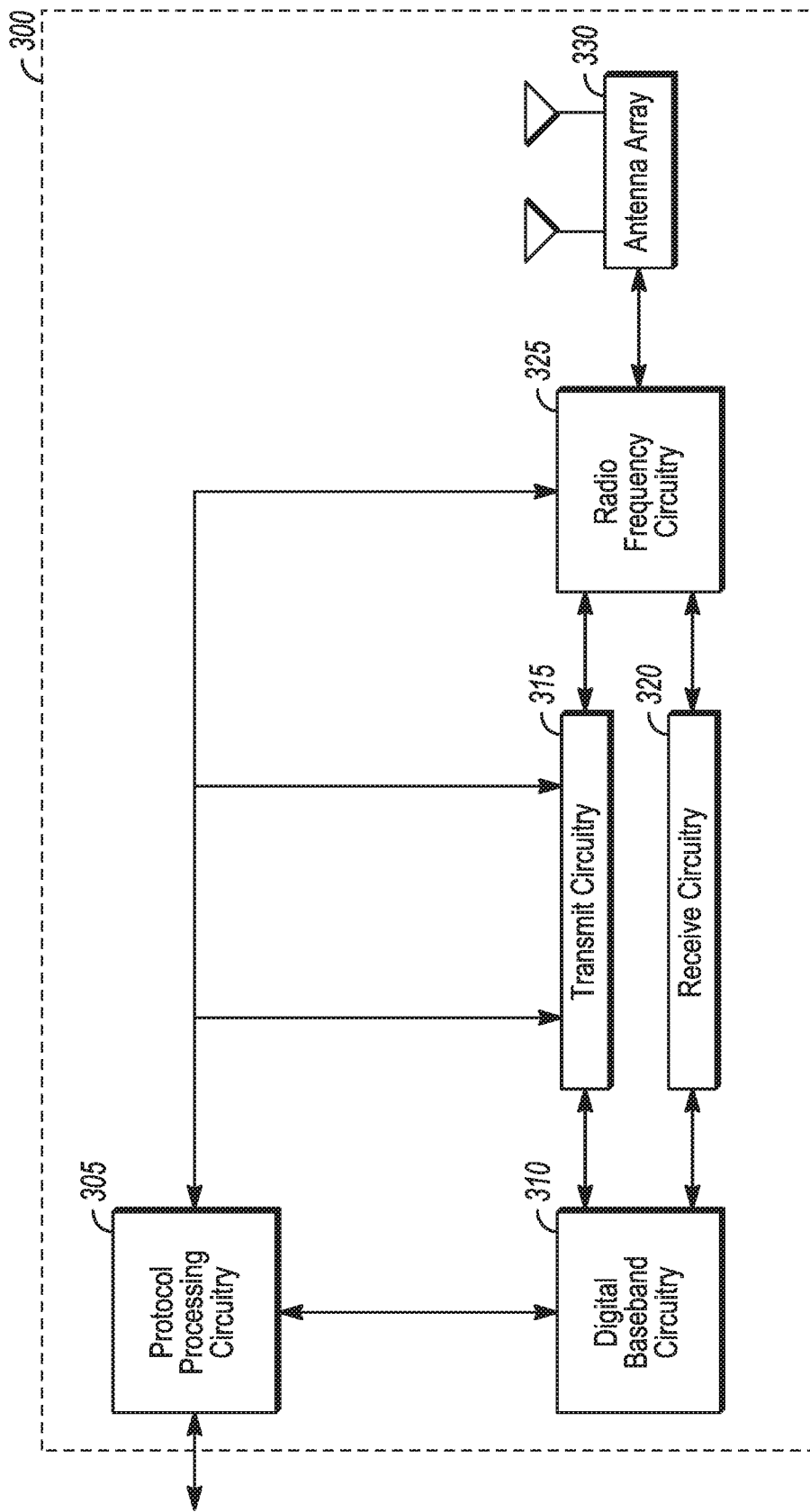
FIG. 3 illustrates millimeter wave communication circuitry in accordance with some embodiments.

FIG. 3 illustrates millimeter wave communication circuitry in accordance with some embodiments. Circuitry 300 is alternatively grouped according to functions. Components as shown in 300 are shown here for illustrative purposes and may include other components not shown here.

Millimeter wave communication circuitry 300 may include protocol processing circuitry 305, which may implement one or more of medium access control (MAC), radio link control (RLC), packet data convergence protocol (PDCP), radio resource control (RRC) and non-access stratum (NAS) functions. Protocol processing circuitry 305 may include one or more processing cores (not shown) to execute instructions and one or more memory structures (not shown) to store program and data information.

Millimeter wave communication circuitry 300 may further include digital baseband circuitry 310, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

Millimeter wave communication circuitry 300 may further include transmit circuitry 315, receive circuitry 320 and/or antenna array circuitry 330.

Millimeter wave communication circuitry 300 may further include radio frequency (RF) circuitry 325. In an aspect, RF circuitry 325 may include multiple parallel RF chains for one or more of transmit or receive functions, each connected to one or more antennas of the antenna array 330.

In an aspect of the disclosure, protocol processing circuitry 305 may include one or more instances of control circuitry (not shown) to provide control functions for one or more of digital baseband circuitry 310, transmit circuitry 315, receive circuitry 320, and/or radio frequency circuitry 325.

The transmit circuitry of may include one or more of digital to analog converters (DACs), analog baseband circuitry, up-conversion circuitry and filtering and amplification circuitry, the latter of which may provide an amount of amplification that is controlled by an automatic gain control (AGC). In another aspect, the transmit circuitry may include digital transmit circuitry and output circuitry.

The radio frequency circuitry may include one or more instances of radio chain circuitry, which in some aspects may include one or more filters, power amplifiers, low noise amplifiers, programmable phase shifters and power supplies. The radio frequency circuitry may include power combining and dividing circuitry in some aspects. In some aspects, the power combining and dividing circuitry may operate bidirectionally, such that the same physical circuitry may be configured to operate as a power divider when the device is transmitting, and as a power combiner when the device is receiving In some aspects, the power combining and dividing circuitry may one or more include wholly or partially separate circuitries to perform power dividing when the device is transmitting and power combining when the device is receiving. In some aspects, the power combining and dividing circuitry may include passive circuitry comprising one or more two-way power divider/combiners arranged in a tree. In some aspects, the power combining and dividing circuitry may include active circuitry comprising amplifier circuits.

In some aspects, the radio frequency circuitry may connect to transmit circuitry and receive circuitry via one or more radio chain interfaces or a combined radio chain interface. In some aspects, one or more radio chain interfaces may provide one or more interfaces to one or more receive or transmit signals, each associated with a single antenna structure which may comprise one or more antennas.

In some aspects, the combined radio chain interface may provide a single interface to one or more receive or transmit signals, each associated with a group of antenna structures comprising one or more antennas.

The receive circuitry may include one or more of parallel receive circuitry and/or one or more of combined receive circuitry. In some aspects, the one or more parallel receive circuitry and one or more combined receive circuitry may include one or more Intermediate Frequency (IF) down-conversion circuitry, IF processing circuitry, baseband down-conversion circuitry, baseband processing circuitry and analog-to-digital converter (ADC) circuitry.

In an aspect, the RF circuitry may include one or more of each of IF interface circuitry, filtering circuitry, upconversion and downconversion circuitry, synthesizer circuitry, filtering and amplification circuitry, power 1o combining and dividing circuitry and radio chain circuitry.

In an aspect, the baseband processor may contain one or more digital baseband systems. In an aspect, the one or more digital baseband subsystems may be coupled via an interconnect subsystem to one or more of a CPU subsystem, audio subsystem and interface subsystem. In an aspect, the one or more digital baseband subsystems may be coupled via another interconnect subsystem to one or more of each of digital baseband interface and mixed-signal baseband sub-system. In an aspect, the interconnect subsystems may each include one or more of each of buses point-to-point connections and network-on-chip (NOC) structures.

In an aspect, an audio sub-system may include one or more of digital signal processing circuitry, buffer memory, program memory, speech processing accelerator circuitry, data converter circuitry such as analog-to-digital and digital-to-analog converter circuitry, and analog circuitry including one or more of amplifiers and filters. In an aspect, a mixed signal baseband sub-system may include one or more of an IF interface, analog IF subsystem, downconverter and upconverter subsystem, analog baseband subsystem, data converter subsystem, synthesizer and control sub-system.

A baseband processing subsystem may include one or more of each of DSP sub-systems, interconnect sub-system, boot loader sub-system, shared memory sub-system, digital I/O sub-system, digital baseband interface sub-system and audio sub-system. In an example aspect, the baseband processing subsystem may include one or more of each of an accelerator subsystem, buffer memory, interconnect subsystem, audio sub-system, shared memory sub-system, digital I/O subsystem, controller sub-system and digital baseband interface sub-system.

In an aspect, the boot loader sub-system may include digital logic circuitry configured to perform configuration of the program memory and running state associated with each of the one or more DSP sub-systems. The configuration of the program memory of each of the one or more DSP sub-systems may include loading executable program code from storage external to baseband processing sub-system. The configuration of the running state associated with each of the one or more DSP sub-systems may include one or more of the steps of: setting the state of at least one DSP core which may be incorporated into each of the one or more DSP sub-systems to a state in which it is not running, and setting the state of at least one DSP core which may be incorporated into each of the one or more DSP sub-systems into a state in which it begins executing program code starting from a predefined memory location.

In an aspect, the shared memory sub-system may include one or more of a read-only memory (ROM), static random access memory (SRAM), embedded dynamic random access memory (eDRAM) and non-volatile random access memory (NVRAM). In an aspect, the digital I/O subsystem may include one or more of serial interfaces such as $I^2C$, SPI or other 1, 2 or 3-wire serial interfaces, parallel interfaces such as general-purpose input-output (GPIO), register access interfaces and direct memory access (DMA). In an aspect, a register access interface implemented in digital I/O subsystem may permit a microprocessor core external to baseband processing subsystem (1000 cross reference) to read and/or write one or more of control and data registers and memory. In an aspect, DMA logic circuitry implemented in digital I/O subsystem may permit transfer of contiguous blocks of data between memory locations including memory locations internal and external to baseband processing subsystem In an aspect, the digital baseband interface sub-system may provide for the transfer of digital baseband samples between the baseband processing subsystem and mixed signal baseband or radio-frequency circuitry external to the baseband processing subsystem. In an aspect, the digital baseband samples transferred by the digital baseband interface sub-system may include in-phase and quadrature (IQ) samples.

In an aspect, the controller sub-system may include one or more of each of control and status registers and control state machines. In an aspect, the control and status registers may be accessed via a register interface and may provide for one or more of: starting and stopping operation of control state machines, resetting control state machines to a default state, configuring optional processing features, configuring the generation of interrupts and reporting the status of operations. In an aspect, each of the one or more control state machines may control the sequence of operation of each of the one or more accelerator sub-systems.

In an aspect, the DSP sub-system may include one or more of each of a DSP core sub-system, local memory, direct memory access sub-system, accelerator sub-system, external interface sub-system, power management unit and interconnect sub-system. In an aspect, the local memory may include one or more of each of read-only memory, static random access memory or embedded dynamic random access memory. In an aspect, the direct memory access sub-system may provide registers and control state machine circuitry adapted to transfer blocks of data between memory locations including memory locations internal and external to the digital signal processor sub-system. In an aspect, the external interface sub-system may provide for access by a microprocessor system external to DSP sub-system to one or more of memory, control registers and status registers which may be implemented in the DSP sub-system. In an aspect, the external interface sub-system may provide for transfer of data between local memory and storage external to the DSP sub-system under the control of one or more of the DMA sub-system and DSP core sub-system.

Figure 4:
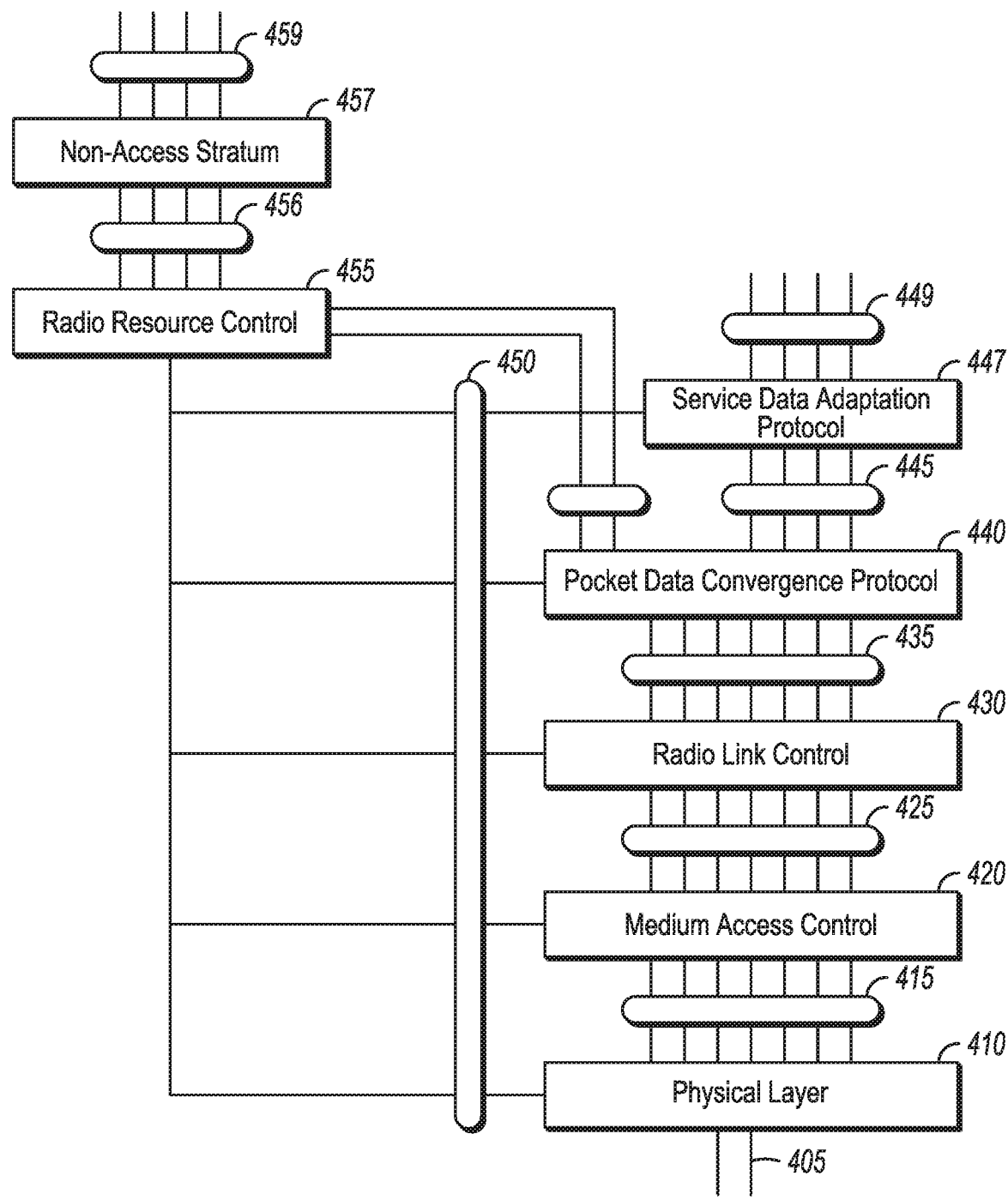
FIG. 4 is an illustration of protocol functions in accordance with some embodiments.

FIG. 4 is an illustration of protocol functions in accordance with some embodiments. The protocol functions may be implemented in a wireless communication device according to some aspects. In some aspects, the protocol layers may include one or more of physical layer (PHY) 410, medium access control layer (MAC) 420, radio link control layer (RLC) 430, packet data convergence protocol layer (PDCP) 440, service data adaptation protocol (SDAP) layer 447, radio resource control layer (RRC) 455, and non-access stratum (NAS) layer 457, in addition to other higher layer functions not illustrated.

According to some aspects, the protocol layers may include one or more service access points that may provide communication between two or more protocol layers. According to some aspects, the PHY 410 may transmit and receive physical layer signals 405 that may be received or transmitted respectively by one or more other communication devices. According to some aspects, physical layer signals 405 may comprise one or more physical channels.

According to some aspects, an instance of PHY 410 may process requests from and provide indications to an instance of MAC 420 via one or more physical layer service access points (PHY-SAP) 415. According to some aspects, requests and indications communicated via PHY-SAP 415 may comprise one or more transport channels.

According to some aspects, an instance of MAC 410 may process requests from and provide indications to an instance of RLC 430 via one or more medium access control service access points (MAC-SAP) 425. According to some aspects, requests and indications communicated via MAC-SAP 425 may comprise one or more logical channels.

According to some aspects, an instance of RLC 430 may process requests from and provide indications to an instance of PDCP 440 via one or more radio link control service access points (RLC-SAP) 435. According to some aspects, requests and indications communicated via RLC-SAP 435 may comprise one or more RLC channels.

According to some aspects, an instance of PDCP 440 may process requests from and provide indications to one or more of an instance of RRC 455 and one or more instances of SDAP 447 via one or more packet data convergence protocol service access points (PDCP-SAP) 445. According to some aspects, requests and indications communicated via PDCP-SAP 445 may comprise one or more radio bearers.

According to some aspects, an instance of SDAP 447 may process requests from and provide indications to one or more higher layer protocol entities via one or more service data adaptation protocol service access points (SDAP-SAP) 449. According to some aspects, requests and indications communicated via SDAP-SAP 449 may comprise one or more quality of service (QoS) flows.

According to some aspects, RRC entity 455 may configure, via one or more management service access points (M-SAP), aspects of one or more protocol layers, which may include one or more instances of PHY 410. MAC 420, RLC 430, PDCP 440 and SDAP 447. According to some aspects, an instance of RRC 455 may process requests from and provide indications to one or more NAS entities via one or more RRC service access points (RRC-SAP) 456.

Figure 5:
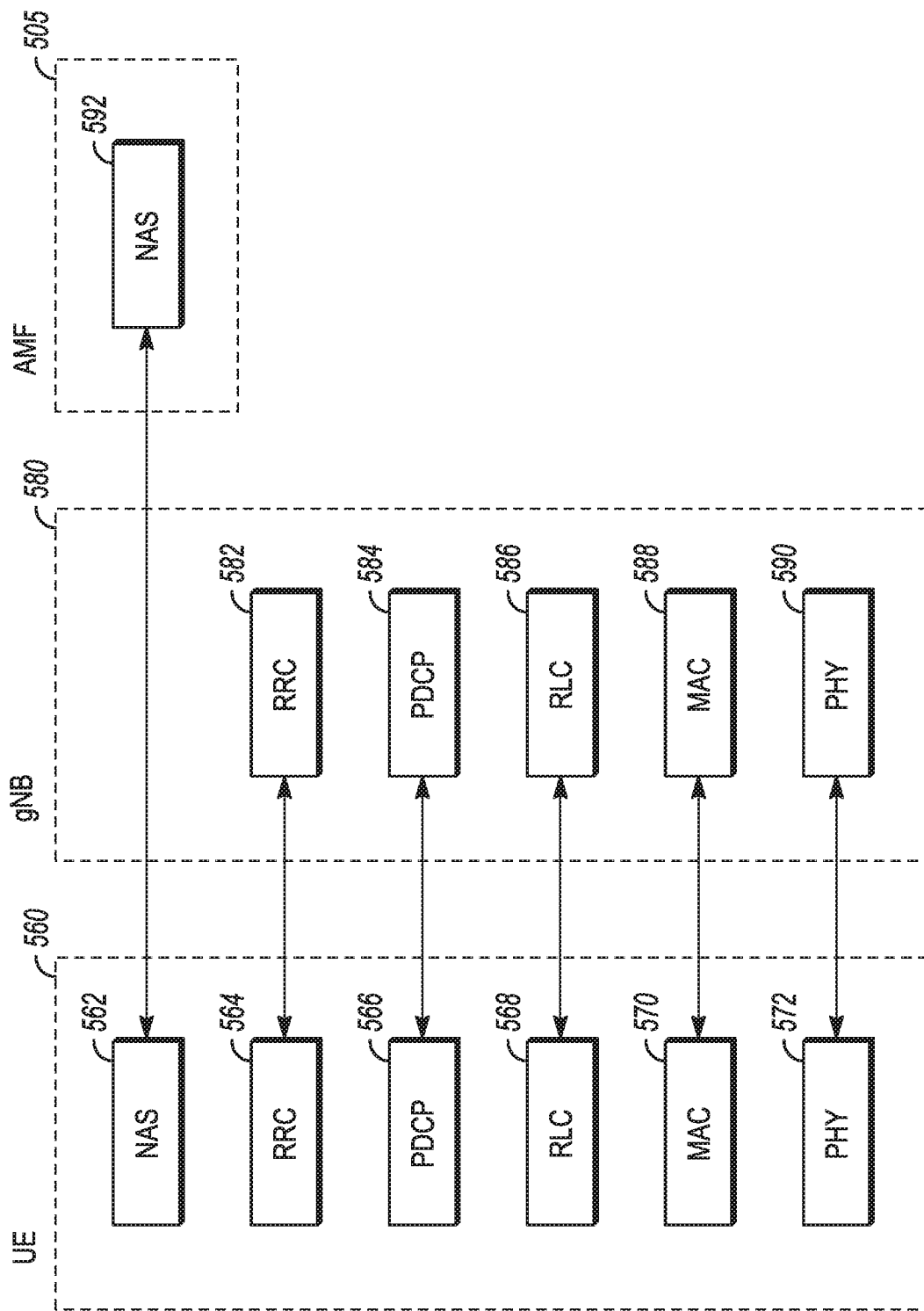
FIG. 5 is an illustration of protocol entities in accordance with some embodiments.

FIG. 5 is an illustration of protocol entities in accordance with some embodiments. The protocol entities may be implemented in wireless communication devices, including one or more of a user equipment (UE) 560, a base station, which may be termed an evolved node B (eNB), or new radio node B (gNB) 580, and a network function, which may be termed a mobility management entity (MME), or an access and mobility management function (AMF) 594, according to some aspects.

According to some aspects, gNB 580 may be implemented as one or more of a dedicated physical device such as a macro-cell, a femto-cell or other suitable device, or in an alternative aspect, may be implemented as one or more software entities running on server computers as part of a virtual network termed a cloud radio access network (CRAN).

According to some aspects, one or more protocol entities that may be implemented in one or more of UE 560, gNB 580 and AMF 594, may be described as implementing all or part of a protocol stack in which the layers are considered to be ordered from lowest to highest in the order PHY, MAC, RLC, PDCP, RRC and NAS. According to some aspects, one or more protocol entities that may be implemented in one or more of UE 560, gNB 580 and AMF 594, may communicate with a respective peer protocol entity that may be implemented on another device, using the services of respective lower layer protocol entities to perform such communication.

According to some aspects, UE PHY 572 and peer entity gNB PHY 590 may communicate using signals transmitted and received via a wireless medium. According to some aspects, UE MAC 570 and peer entity gNB MAC 588 may communicate using the services provided respectively by UE PHY 572 and gNB PHY 590. According to some aspects. UE RLC 568 and peer entity gNB RLC 586 may communicate using the services provided respectively by UE MAC 570 and gNB MAC 588. According to some aspects, UE PDCP 566 and peer entity gNB PDCP 584 may communicate using the services provided respectively by UE RLC 568 and 5GNB RLC 586. According to some aspects, UE RRC 564 and gNB RRC 582 may communicate using the services provided respectively by UE PDCP 566 and gNB PDCP 584. According to some aspects, UE NAS 562 and AMF NAS 592 may communicate using the services provided respectively by UE RRC 564 and gNB RRC 582.

The UE and gNB may communicate using a radio frame structure that has a predetermined duration and repeats in a periodic manner with a repetition interval equal to the predetermined duration. The radio frame may be divided into two or more subframes. In an aspect, subframes may be of predetermined duration which may be unequal. In an alternative aspect, subframes may be of a duration which is determined dynamically and varies between subsequent repetitions of the radio frame. In an aspect of frequency division duplexing (FDD), the downlink radio frame structure is transmitted by a base station to one or devices, and uplink radio frame structure transmitted by a combination of one or more devices to a base station. The radio frame may have a duration of 10 ms. The radio frame may be divided into slots each of duration 0.5 ms, and numbered from 0 to 19. Additionally, each pair of adjacent slots numbered 2i and 2i+1, where i is an integer, may be referred to as a subframe. Each subframe may include a combination of one or more of downlink control information, downlink data information, uplink control information and uplink data information. The combination of information types and direction may be selected independently for each subframe.

According to some aspects, the downlink frame and uplink frame may have a duration of 10 ms, and uplink frame may be transmitted with a timing advance with respect to downlink frame. According to some aspects, the downlink frame and uplink frame may each be divided into two or more subframes, which may be 1 ms in duration. According to some aspects, each subframe may consist of one or more slots. In some aspects, the time intervals may be represented in units of $T_s$. According to some aspects, $T_s$ may be defined as $1/(30.720\times1000)$ seconds. According to some aspects, a radio frame may be defined as having duration 30, 720. $T_s$, and a slot may be defined as having duration 15,360. $T_s$. According to some aspects, T may be defined as $$T_s = 1/(\Delta f_{max} \cdot N_f),$$

where $\Delta f_{max}=480\times 10^3$ and $Nf=4,096$. According to some aspects E, the number of slots may be determined based on a numerology parameter, which may be related to a frequency spacing between subcarriers of a multicarrier signal used for transmission.

Constellation designs of a single carrier modulation scheme that may be transmitted or received may contain 2 points, known as binary phase shift keying (BPSK), 4 points, known as quadrature phase shift keying (QPSK), 16 points, known as quadrature amplitude modulation (QAM) with 16 points (16QAM or QAM16) or higher order modulation constellations, containing for example 64, 256 or 1024 points. In the constellations, the binary codes are assigned to the points of the constellation using a scheme such that nearest-neighbor points, that is, pairs of points separated from each other by the minimum Euclidian distance, have an assigned binary code differing by only one binary digit. For example, the point assigned code 100 has nearest neighbor points assigned codes 1001, 0000, 1100 and 1010, each of which differs from 1000 by only one bit.

Alternatively, the constellation points may be arranged in a square grid, and may be arranged such that there is an equal distance on the in-phase and quadrature plane between each pair of nearest-neighbor constellation points. In an aspect, the constellation points may be chosen such that there is a pre-determined maximum distance from the origin of the in-phase and quadrature plane of any of the allowed constellation points, the maximum distance represented by a circle. In an aspect, the set of allowed constellation points may exclude those that would fall within square regions at the corners of a square grid. The constellation points are shown on orthogonal in-phase and quadrature axes, representing, respectively, amplitudes of sinusoids at the carrier frequency and separated in phase from one another by 90 degrees. In an aspect, the constellation points are grouped into two or more sets of constellation points, the points of each set being arranged to have an equal distance to the origin of the in-phase and quadrature plane, and lying on one of a set of circles centered on the origin.

To generate multicarrier baseband signals for transmission, data may be input to an encoder to generate encoded data. The encoder may include a combination of one or more of error detecting, error correcting, rate matching, and interleaving. The encoder may further include a step of scrambling. In an aspect, encoded data may be input to a modulation mapper to generate complex valued modulation symbols. The modulation mapper may map groups containing one or more binary digits, selected from the encoded data, to complex valued modulation symbols according to one or more mapping tables. In an aspect, complex-valued modulation symbols may be input to the layer mapper to be mapped to one or more layer mapped modulation symbol streams. Representing a stream of modulation symbols 440 as d(i) where i represents a sequence number index, and the one or more streams of layer mapped symbols as $x^{(k)}(i)$ where k represents a stream number index and i represents a sequence number index, the layer mapping function for a single layer may be expressed as:

$x^{(0)}(i)=d(i)$ and the layer mapping for two layers may be expressed as:

$x^{(0)}(i)=d(2i)$ $x^{(1)}(i)=d(2i+1)$

Layer mapping may be similarly represented for more than two layers.

In an aspect, one or more streams of layer mapped symbols may be input to the precoder which generates one or more streams of precoded symbols. Representing the one or more streams of layer mapped symbols as a block of vectors:

$[x^{(0)}(i) \ldots x^{(v-1)}(i)]^T$ where i represents a sequence number index in the range 0 to $M_{symb}^{layer}-1$ the output is represented as a block of vectors:

$[z^{(0)}(i) \ldots z^{(P-1)}(i)]^T$ where i represents a sequence number index in the range 0 to $M_{symb}^{ap}-1$. The precoding operation may be configured to include one of direct mapping using a single antenna port, transmit diversity using space-time block coding, or spatial multiplexing.

In an aspect, each stream of precoded symbols may be input to a resource mapper which generates a stream of resource mapped symbols. The resource mapper may map precoded symbols to frequency domain subcarriers and time domain symbols according to a mapping which may include contiguous block mapping, randomized mapping or sparse mapping according to a mapping code.

In an aspect, the resource mapped symbols may be input to multicarrier generator which generates a time domain baseband symbol. Multicarrier generator may generate time domain symbols using, for example, an inverse discrete Fourier transform (DFT), commonly implemented as an inverse fast Fourier transform (FFT) or a filter bank comprising one or more filters. In an aspect, where resource mapped symbols 455 are represented as $s_k(i)$, where k is a subcarrier index and i is a symbol number index, a time domain complex baseband symbol x(t) may be represented as:

$$x(t) = \sum_k s_k(i) p_T(t - T_{sym}) \exp[j2\pi f_k(t - T_{sym} - \tau_k)]$$

Where $p_T(t)$ is a prototype filter function, $T_{sym}$ is the start time of the symbol period, a is a subcarrier dependent time offset, and $f_k$ is the frequency of subcarrier k. Prototype functions $p_T(t)$ may be, for example, rectangular time domain pulses, Gaussian time domain pulses or any other suitable function.

In some aspects, a sub-component of a transmitted signal consisting of one subcarrier in the frequency domain and one symbol interval in the time domain may be termed a resource element. Resource elements may be depicted in a grid form. In some aspects, resource elements may be grouped into rectangular resource blocks consisting of 12 subcarriers in the frequency domain and the P symbols in the time domain, where P may correspond to the number of symbols contained in one slot, and may be 6, 7, or any other suitable number of symbols. In some alternative aspects, resource elements may be grouped into resource blocks consisting of 12 subcarriers in the frequency domain and one symbol in the time domain. Each resource element 05 may be indexed as (k, l) where k is the index number of subcarrier, in the range 0 to N·M−1, where N is the number of subcarriers in a resource block, and M is the number of resource blocks spanning a component carrier in the frequency domain.

In some aspects, coding of the signal to be transmitted may include one or more physical coding processes that may be used to provide coding for a physical channel that may encode data or control information. Coding may also include multiplexing and interleaving that generates combined coded information by combining information from one or more sources, which may include one of more of data information and control information, and which may have been encoded by one or more physical coding processes. The combined coded information may be input to a scrambler which may generate scrambled coded information. Physical coding process may include one or more of CRC attachment, code block segmentation, channel coding, rate matching and code block concatenation. An encoder that may be used to encode data according to one of a convolutional code and a tail-biting convolutional code.

A MAC entity that may be used to implement medium access control layer functions may include one or more of a controller, a logical channel prioritizing unit, a channel multiplexer & de-multiplexer, a PDU filter unit, random access protocol entity, data hybrid automatic repeat request protocol (HARQ) entity and broadcast HARQ entity. According to some aspects, a higher layer may exchange control and status messages with controller via management service access point. According to some aspects, MAC service data units (SDU) corresponding to one or more logical channels may be exchanged with the MAC entity via one or more service access points (SAP). According to some aspects, a PHY SDU corresponding to one or more transport channels may be exchanged with a physical layer entity via one or more SAPs. According to some aspects, the logical channel prioritization unit may perform prioritization amongst one or more logical channels, which may include storing parameters and state information corresponding to each of the one or more logical channels, that may be initialized when a logical channel is established. According to some aspects, the logical channel prioritization unit may be configured with a set of parameters for each of one or more logical channels, each set including parameters which may include one or more of a prioritized bit rate (PBR) and a bucket size duration (BSD).

According to some aspects, the multiplexer & de-multiplexer may generate MAC PDUs, which may include one or more of MAC-SDUs or partial MAC-SDUs corresponding to one or more logical channels, a MAC header which may include one or more MAC sub-headers, one or more MAC control elements, and padding data. According to some aspects, the multiplexer & de-multiplexer may separate one or more MAC-SDUs or partial MAC-SDUs contained in a received MAC PDU, corresponding to one or more logical channels, and may indicate the one or more MAC-SDUs or partial MAC-SDUs to a higher layer via one or more service access points. According to some aspects, the HARQ entity and broadcast HARQ entity may include one or more parallel HARQ processes, each of which may be associated with a HARQ identifier, and which may be one of a receive or transmit HARQ process.

According to some aspects, a transmit HARQ process may generate a transport block (TB) to be encoded by the PHY according to a specified redundancy version (RV), by selecting a MAC-PDU for transmission. According to some aspects, a transmit HARQ process that is included in a broadcast HARQ entity may retransmit a same TB in successive transmit intervals a predetermined number of times. According to some aspects, a transmit HARQ process included in a HARQ entity may determine whether to retransmit a previously transmitted TB or to transmit a new TB at a transmit time based on whether a positive acknowledgement or a negative acknowledgement was received for a previous transmission.

According to some aspects, a receive HARQ process may be provided with encoded data corresponding to one or more received TBs and which may be associated with one or more of a new data indication (NDI) and a redundancy version (RV), and the receive HARQ process may determine whether each such received encoded data block corresponds to a retransmission of a previously received TB or a not previously received TB. According to some aspects, a receive HARQ process may include a buffer, which may be implemented as a memory or other suitable storage device, and may be used to store data based on previously received data for a TB. According to some aspects, a receive HARQ process may attempt to decode a TB, the decoding based on received data for the TB, and which may be additionally based on the stored data based on previously received data for the TB.

Figure 6:
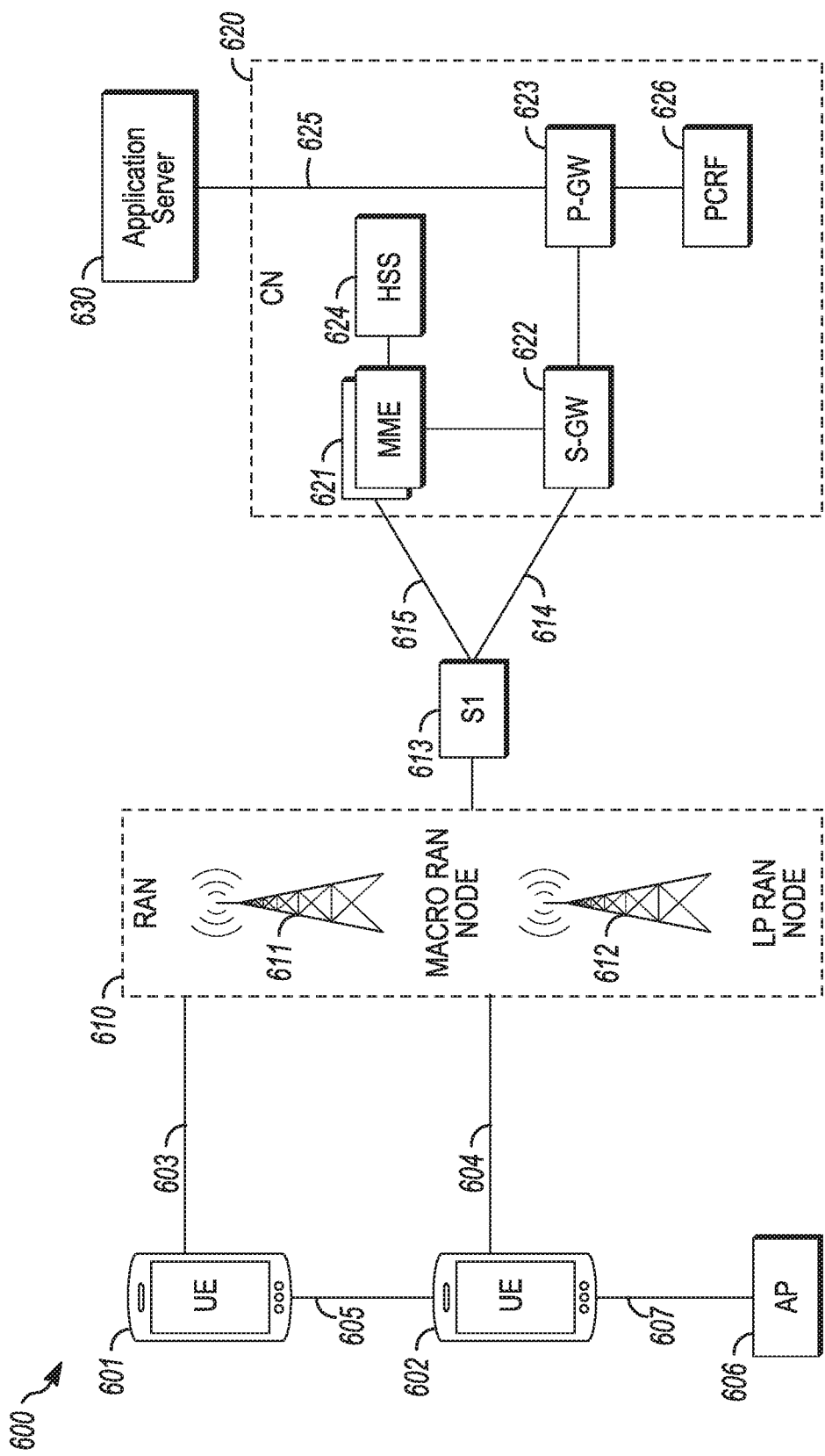
FIG. 6 illustrates an architecture of a system of a network in accordance with some embodiments.

FIG. 6 illustrates an architecture of a system of a network in accordance with some embodiments. The system 600 is shown to include a user equipment (UE) 601 and a UE 602. The UEs 601 and 602 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 601 and 602 can comprise an Internet of Things (IoT) UE, which can compose a network access layer designed for low-power IoT applications utilizing short-lived UE connections. An IoT UE can utilize technologies such as machine-to-machine (M2M) or MTC for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 601 and 602 may be configured to connect, e.g., communicatively couple, with a radio access network (RAN) 610—the RAN 610 may be, for example, an Evolved Universal Mobile Telecommunications System (UMTS) Terrestrial Radio Access Network (E-UTRAN), a NextGen RAN (NG RAN), or some other type of RAN. The UEs 601 and 602 utilize connections 603 and 604, respectively, each of which comprises a physical communications interface or layer (discussed in further detail below); in this example, the connections 603 and 604 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a New Radio (NR) protocol, and the like.

In this embodiment, the UEs 601 and 602 may further directly exchange communication data via a ProSe interface 605. The ProSe interface 605 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 602 is shown to be configured to access an access point (AP) 606 via connection 607. The connection 607 can comprise a local wireless connection, such as a connection consistent with any IEEE 802.11 protocol, wherein the AP 606 would comprise a wireless fidelity (WiFi) router. In this example, the AP 606 is shown to be connected to the Internet without connecting to the core network of the wireless system (described in further detail below).

The RAN 610 can include one or more access nodes that enable the connections 603 and 604. These access nodes (ANs) can be referred to as base stations (BSs), NodeBs, evolved NodeBs (eNBs), next Generation NodeBs (gNBs), RAN nodes, and so forth, and can comprise ground stations (e.g., terrestrial access points) or satellite stations providing coverage within a geographic area (e.g., a cell). The RAN 610 may include one or more RAN nodes for providing macrocells, e.g., macro RAN node 611, and one or more RAN nodes for providing femtocells or picocells (e.g., cells having smaller coverage areas, smaller user capacity, or higher bandwidth compared to macrocells), e.g., low power (LP) RAN node 612.

Any of the RAN nodes 611 and 612 can terminate the air interface protocol and can be the first point of contact for the UEs 601 and 602. In some embodiments, any of the RAN nodes 611 and 612 can fulfill various logical functions for the RAN 610 including, but not limited to, radio network controller (RNC) functions such as radio bearer management, uplink and downlink dynamic radio resource management and data packet scheduling, and mobility management.

In accordance with some embodiments, the UEs 601 and 602 can be configured to communicate using Orthogonal Frequency-Division Multiplexing (OFDM) communication signals with each other or with any of the RAN nodes 611 and 612 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

The physical downlink shared channel (PDSCH) may carry user data and higher-layer signaling to the UEs 601 and 602. The physical downlink control channel (PDCCH) may carry information about the transport format and resource allocations related to the PDSCH channel, among other things. It may also inform the UEs 601 and 602 about the transport format, resource allocation, and H-ARQ (Hybrid Automatic Repeat Request) information related to the uplink shared channel. Typically, downlink scheduling (assigning control and shared channel resource blocks to the UE 602 within a cell) may be performed at any of the RAN nodes 611 and 612 based on channel quality information fed back from any of the UEs 601 and 602. The downlink resource assignment information may be sent on the PDCCH used for (e.g., assigned to) each of the UEs 601 and 602.

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 610 is shown to be communicatively coupled to a core network (CN) 620—via an S1 or NG interface 613. In embodiments, the CN 620 may be an evolved packet core (EPC) network, a 5GC network, or some other type of CN. In this embodiment, the S1 interface 613 is split into two parts: the S1-U interface 614, which carries traffic data between the RAN nodes 611 and 612 and the serving gateway (S-GW) 622, and the S1-mobility management entity (MME) interface 615, which is a signaling interface between the RAN nodes 611 and 612 and MMEs 621.

In this embodiment, the CN 620 comprises the MMEs 621, the S-GW 622, the Packet Data Network (PDN) Gateway (P-GW) 623, and a home subscriber server (HSS) 624. The MMEs 621 may be similar in function to the control plane of legacy Serving General Packet Radio Service (GPRS) Support Nodes (SGSN). The MMEs 621 may manage mobility aspects in access such as gateway selection and tracking area list management. The HSS 624 may comprise a database for network users, including subscription-related information to support the network entities' handling of communication sessions. The CN 620 may comprise one or several HSSs 624, depending on the number of mobile subscribers, on the capacity of the equipment, on the organization of the network, etc. For example, the HSS 624 can provide support for routing/roaming, authentication, authorization, naming/addressing resolution, location dependencies, etc.

The S-GW 622 may terminate the S1 interface 613 towards the RAN 610, and routes data packets between the RAN 610 and the CN 620. In addition, the S-GW 622 may be a local mobility anchor point for inter-RAN node handovers and also may provide an anchor for inter-3GPP mobility. Other responsibilities may include lawful intercept, charging, and some policy enforcement.

The P-GW 623 may terminate an SGi interface toward a PDN. The P-GW 623 may route data packets between the EPC network 623 and external networks such as a network including the application server 630 (alternatively referred to as application function (AF)) via an Internet Protocol (IP) interface 625. Generally, the application server 630 may be an element offering applications that use IP bearer resources with the core network (e.g., UMTS Packet Services (PS) domain, LTE PS data services, etc.). In this embodiment, the P-GW 623 is shown to be communicatively coupled to an application server 630 via an IP communications interface 625. The application server 630 can also be configured to support one or more communication services (e.g., Voice-over-Internet Protocol (VoIP) sessions, PTT sessions, group communication sessions, social networking services, etc.) for the UEs 601 and 602 via the CN 620.

The P-GW 623 may further be a node for policy enforcement and charging data collection. Policy and Charging Rules Function (PCRF) 626 is the policy and charging control element of the CN 620. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 626 may be communicatively coupled to the application server 630 via the P-GW 623. The application server 630 may signal the PCRF 626 to indicate a new service flow and select the appropriate Quality of Service (QoS) and charging parameters. The PCRF 626 may provision this rule into a Policy and Charging Enforcement Function (PCEF) (not shown) with the appropriate traffic flow template (TFT) and QoS class of identifier (QCI), which commences the QoS and charging as specified by the application server 630.

The components of FIG. 6 are able to read instructions from a machine-readable or computer-readable medium (e.g., a non-transitory machine-readable storage medium) and perform any one or more of the methodologies discussed herein. In particular, the processors (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may read and follow the instructions on a non-transitory medium.

Instructions may comprise software, a program, an application, an applet, an app, or other executable code for causing at least any of the processors to perform any one or more of the methodologies discussed herein. The instructions may reside, completely or partially, within at least one of the processors (e.g., within the processor's cache memory), the memory/storage devices, or any suitable combination thereof. In some embodiments, the instructions may reside on a tangible, non-volatile communication device readable medium, which may include a single medium or multiple media. Furthermore, any portion of the instructions may be transferred to the hardware resources from any combination of the peripheral devices or the databases 606. Accordingly, the memory of processors, the memory/storage devices, the peripheral devices, and the databases are examples of computer-readable and machine-readable media.

As above, a number of different types of UEs have begun using the LTE spectrum. These devices may form the IoT, where massive numbers of devices are connected through the network. Such connected devices have a wide variety of applications in various scenarios, including smart cities, smart environments, smart agriculture, and smart health care systems.

3GPP has standardized designs to support IoT services— eMTC and NB-IoT, which may be deployed in huge numbers. Thus, lowering the cost of these UEs is one of a number of key enablers for implementation of IoT. Another enabler is reduced power consumption to extend the lifetime of the battery in many such devices. The latter of these may be useful as there are substantial number of use cases in which devices may be deployed deep inside buildings, and thereby use coverage enhancement in comparison to the defined LTE cell coverage footprint.

As noted above, both Release (Rel)-13 eMTC and NB-IoT UEs may operate in licensed spectrum. However, the scarcity of licensed spectrum in lower LTE frequency bands may result in insufficient bandwidth to supply for all UEs, leading to a reduction in data throughput. Thus, interest in the operation of LTE systems in unlicensed spectrum has been contemplated. Potential LTE operation in unlicensed spectrum includes, but is not limited to, Carrier Aggregation (CA) based on Licensed Assisted Access (LAA)/enhanced LAA (eLAA) systems, LTE operation in the unlicensed spectrum via dual connectivity (DC), and standalone LTE systems in the unlicensed spectrum. In the latter of these, called MulteFire, LTE-based technology may operate solely in unlicensed spectrum without use of an anchor in licensed spectrum.

To extend the benefits of LTE IoT designs into unlicensed spectrum, MulteFire 1.1 is expected to specify the design for Unlicensed-IoT (U-IoT or UIoT). U-IoT may refer to the operation of IoT devices in the unlicensed spectrum. Various embodiments discussed herein are related to U-IoT systems, and in particular, may be related to eMTC-based U-IoT designs. Similar approaches may be applied to NB-IoT-based U-IoT designs as well as eMTC-based U-IoT designs.

MulteFire and other unlicensed band techniques can be used in any unlicensed spectrum. Future MulteFire deployments are expected in the 5 GHz unlicensed band and potentially also in the 3.5 GHz shared band in the United States. In a MulteFire network, eNBs and/or access points (APs) communicate solely in an unlicensed radio frequency spectrum band. This is different from LAA/LWA and other systems in which a channel in a licensed (LTE) frequency acts as an anchor channel to pass essential information, such as control information, for example. Use of the unlicensed spectrum may impose transmission power limitations and protocols such as Clear Channel Assessment (CCA) and Listen-Before-Talk (LBT) transmission rules if the channel is occupied.

When using the unlicensed bands, eNBs and UEs may determine channel availability via energy detection before transmitting data on the channel. For example, the eNB or UE may determine that the channel is occupied through a predetermined amount of energy being present in the channel or via a change in a received signal strength indication (RSSI). The eNB or UE may detect the presence of a specific sequence, such as a preamble transmitted prior to a data transmission, that indicates use of the channel.

The unlicensed channel may be reserved using a reservation signal to prevent WiFi signals from initiating transmission until the next frame boundary event. Thus, the eNBs and UEs may contend for access to the unlicensed frequency band by performing CCA procedures, and transmitting during transmission opportunities (TxOPs).

In some embodiments, the unlicensed frequency band of interest is the 2.4 GHz band. For global availability, the design may abide by the regulations in different regions (e.g., the regulations given by Federal Communications Commission (FCC) in the United States and the regulations given by European Telecommunications Standards Institute (ETSI) in Europe). Based on these regulations, frequency hopping is more appropriate than other forms of modulation, due to more relaxed power spectrum density (PSD) limitations and co-existence with other unlicensed band technologies, such as Bluetooth and WiFi. Specifically, frequency hopping (intra- or inter-subframe) may have no PSD limit, while other wideband modulations may have a PSD limit of 10 dBm/MHz in regulations given by ETSI. A low PSD limit may result in more limited coverage for the eNB. Thus, eMTC-U with frequency hopping embodiments are described below.

The MulteFire system may contain one or more anchor channels and one or more non-anchor (data) channels, all of which occupy the unlicensed band. The anchor channel may contain control information and be transmitted at one or more fixed frequency locations. The anchor channel may contain the primary synchronization signal (PSS) and secondary synchronization signal (SSS). In further embodiments, the anchor channel may also contain a Physical Broadcast Channel (PBCH). The PBCH signal may contain the system frame number (SFN) and System Information Broadcast Master File (SIB-MF) scheduling information, including the transport block size (TBS) and number of repetitions. If the SIB-MF is transmitted on a data channel, the PBCH signal may contain the next hopping channel for frequency non-adaptive hopping or the hopping sequence, the next hopping channel and the dwell time for adaptive hopping. The SIB-MF may provide information to the UE for UL and DL transmissions, access and RACH information and dwell time of each data channel for frequency hopping. The dwell times for the data channels may be equal. The SIB-MF may indicate the total dwell time or the individual UL and DL durations of the dwell time. In some embodiments, when the anchor channel dwell time is small, the SIB-MF for eMTC-U may be transmitted in the data channel. If the anchor channel dwell time is small, the eNB may make more frequent returns to the anchor channel to enable faster initial access for UEs.

Two types of frequency hopping systems exist: adaptive and non-adaptive. In non-adaptive frequency hopping, channels on which to transmit vary periodically to reduce interference. In adaptive frequency hopping, channels on which to transmit vary periodically and, the channel selection further takes into account interference from fixed sources of interference. In both case, system information, such as Discovery Reference Signals (DRS), PBCH, and paging can be transmitted on limited number of anchor channels (a single anchor channel or multiple anchor channels) to reduce UE search time and power consumption.

The frequency hopping used on the MulteFire system, in addition to the use of both anchor and non-anchor channels may increase the complexity of reference signal measurement. Such reference signals may be used for mobility management, radio link control or channel quality measurements, for example. The complexity may be further increased, as not only do the channels of the serving eNB frequency hop, but also, the channels of neighbor cells may frequency hop. To accurately measure the reference signals of the neighbor cells, the UE may be provided and keep track of the frequency hopping schedule of the neighbor cells as well as any channels to be skipped, for example.

The UE may periodically make one or more Radio Resource Management (RRM) measurements for various purposes, such as handover and channel selection. RRM measurements may include Channel Quality Indicator (CQI), Reference Signal Received Power (RSRP), Reference Signal. Received Quality (RSRQ), and Carrier Received Signal Strength Indicator (RSSI). RRM measurements may be undertaken on various reference signals transmitted by the eNB. The reference signals, as other signals, may be encoded by the transmitting entity (whether eNB or UE) before transmission and similarly decoded by the receiving entity. The DRS may include Primary Synchronization Signals (PSS), Secondary Synchronization Signals (SSS), Cell-Specific Reference Signals (CRS), and Channel State Information Reference Signals (CSI-RS). Due to the impact of LBT, however, RRM measurements may be performed on a DRS Measurement Timing Configuration (DMTC) window within which the UE receives the DRS at DRS occasions. The DRS transmissions may be periodic, with the duration between successive transmissions set to 40, 80 or 160 ms. The DRS transmissions may occur at different time-offsets within the DMTC window. More specifically, DRS occasions may occur on predetermined subframes within a DMTC window. For a synchronous network, the DMTC window may have a maximum length of 10 ms. In a synchronous network or loosely synchronous network, the DMTC periodicity and length can be sent to the UE to facilitate the DRS measurement. For an asynchronous network, a sliding window measurement may be used.

Some embodiments herein relate to RRM and other measurements for eMTC-U (2.4 GHz band), although similar ideas can be applied to NB-IoT-U. In some embodiments, RRM measurements of neighbor cells may be made only on the anchor channel. In other embodiments, RRM measurements of the neighbor cells may be made on both the anchor channel and at least one non-anchor channel. In some embodiments, the measurement gap (time period of no UL/DL communication with the serving eNB) configuration may indicate the measurement gap periodicity, offset, length, and the frequency channel where the non-anchor channel of a neighbor cell is to hop. The measurement gap configuration may be provided in the anchor channel of the serving eNB. In some embodiments, the measurement gap configuration may be sliding (relative to the neighbor cell frame structure), with the serving eNB having no knowledge of the neighbor cell timing (i.e., asynchronous).

In some embodiments, RRM measurements for all neighbor cells may be taken on the anchor channel. RRM measurements on the anchor channel may be able to be performed for non-adaptive frequency hopping, non-LBT-based adaptive frequency hopping, LBT-based adaptive frequency hopping without channel skipping, and LBT-based adaptive frequency hopping with channel skipping. Channel skipping may be used to avoid channels that are occupied by other UEs or eNBs.

In a synchronous network, the eNB may provide to the UE the neighbor cell anchor channel periodicity and dwell time. RRM measurements when the neighbor cell anchor channel dwell time is aligned with the serving cell may be equivalent to an intra-frequency measurement. FIG. 7 illustrates a measurement gap configuration in a synchronous network in accordance with some embodiments. FIG. 7 shows only the signals of interest in the synchronous network 70; other signals may be present, but are not shown for convenience. In this case, the serving eNB may provide a measurement gap during the anchor channel transmission.

When the neighbor cell dwell time is not aligned with the serving cell, the serving eNB may provide a measurement gap configuration to the UE. The size of the measurement gap 704 may set to be longer than the DRS duration. For example, the measurement gap may be 10 or more subframes in duration. In some embodiments, the UE may always perform a RRM measurement on the anchor channel during the measurement gap. As shown in FIG. 7, the duration of the measurement gap 704 is longer than the PSS/SSS/PBCH length combined in the neighbor cell anchor channel 702. The measurement gap may include the RF tuning time and LBT time.

Although FIG. 7 shows a single anchor channel 702, as above, multiple anchor channels may be used. The anchor channels may be associated with a single neighbor cell or multiple neighbor cells. When multiple anchor channels are defined, the measurement gap may be associated with a single one of the anchor channels. Alternatively, a measurement gap may be associated with each of the multiple anchor channels.

For an asynchronous network, the eNB may configure the measurement gap using the sliding window concept adopted in MF 1.0 (in the 5 GHz range). FIG. 8 illustrates a measurement gap configuration in an asynchronous network in accordance with some embodiments. FIG. 8 shows only the signals of interest in the asynchronous network 800; other signals may be present, but are not shown for convenience. As above, the UE may perform RRM measurements on the anchor channel 802 in the measurement gap 804 when the sliding measurement gap 804 overlaps with the neighbor cell anchor channel. This is to say that as the UE but not serving cell is aware of the neighbor cell anchor channel information (periodicity and dwell time), the serving cell may adopt a sliding measurement gap (with respect to timing of the frame structure of the neighbor cell) so the UE can take the RRM measurement at the appropriate time. The UE may be provided the anchor channel information from the neighbor cell or may derive the anchor channel information from information of the neighbor cell. The measurement gap 804 slides with respect to the neighbor cell anchor channel as the serving cell changes the timing of the measurement gap 804. Similar to the embodiment shown in FIG. 7, the duration of the measurement gap 804 may be longer than the PSS/SSS/PBCH length in the anchor channel 802.

When multiple anchor channels are defined, the UE may perform the RRM measurements on a single anchor channel until the sliding measurement gap covers the entire anchor channel periodicity. Then, the UE may move to another anchor channel to perform the RRM measurements.

In some embodiments, for both synchronous and asynchronous neighbor cells, the anchor channel index of the neighbor cell may be different from the anchor channel index of the serving cell. In these cases, the anchor channel index of neighbor cell may be configured by the eNB.

In some embodiments, faster RRM measurements may be desired. To enable faster measurement, in some embodiments, the RRM measurements can be performed on the data channel in addition to or instead of the anchor channel. Due to frequency hopping, the neighbor cell hopping channel may be configured by the eNB together with measurement gap. In some embodiments, the measurement gap configuration has a parameter that indicates the neighbor cell hopping channel for each gap configuration. In other embodiments, the neighbor cell hopping sequence may be transmitted to the UE through a container or tunnel. In other words, the neighbor cell hopping sequence may be encapsulated by the inter-eNB tunnel Therefore, the serving cell eNB may not be aware of the neighbor cell hopping pattern, and may thereby avoid a potential regulation violation. In another embodiment, for synchronous cells, rather than receiving the frequency hopping pattern of the neighbor cell, the UE may instead itself derive the frequency hopping pattern of the neighbor cell. The frequency hopping pattern of the neighbor cell may be derived based on the neighbor cell ID, periodicity, and length.

Measurements on the anchor channel may be used for non-adaptive frequency hopping and non-LBT-based adaptive frequency hopping. To determine whether a channel to frequency hop to is occupied, the UE may detect energy of the preamble transmitted by other eNBs. However, for LBT-based adaptive frequency hopping without skipping, the UE may miss the preamble for presence detection. This may increase the UE complexity to avoid this issue.

Independent of whether the neighbor cells are synchronous or asynchronous, and on which channel(s) the reference signals are measured, the UE may transmit information (e.g., the measurements) to the serving eNB. The serving eNB may determine from the information whether handover to one of the neighbor cells is appropriate.

In addition to performing RRM measurements, the UE may perform radio link monitoring (RLM) using CRS (or other reference) signals, RLM may indicate when the UE is in-sync (Qin) and out-of-sync (Qout). The UE may be considered to be out-of-sync when the radio quality is worse than a first threshold value, Qout, (considered to be the level at which the DL radio link cannot be reliably received) and in-sync when the radio link quality is better than a second threshold value, Qin. For example, the Qout and Qin values may respectively correspond to a 10% and 2% block error rate (BLER) of a hypothetical PDCCH transmission taking into account physical control format indicator channel (PC-FICH) errors, and when averaged over a number of signal to noise ratios (SNR) of the CRS. The hypothetical PDCCHs for Qout and Qin evaluation are defined in the 3GPP TS 36.133. The UE may measure CRS tone quality, and using parameters defined for the hypothetical PDCCHs, predict the BLER of the hypothetical PDCCH transmissions based on the measured CRS tone quality.

For MulteFire, Qin may be measured using a CRS inside and outside of the DRS transmission window. The UE may perform CRS detection to determine whether the signal detected is a valid DL transmission. Qin may be measured only on a valid DL transmission. Qout may be measured in the DRS transmission window only, as the UE may not be able to determine whether the missing DL subframe is due to LBT or due to a bad radio link. This is to say that when the UE assumes it has a radio link and is in-sync, and the DRS signal falls below the Qout threshold, the UE may be unable to determine whether this is because of a bad radio link or because the channel is empty due to the LBT procedure. The BLER setting for missing the DRS may be up to the UE implementation. Moreover, for narrowband transmissions, the DRS may be relatively weak. The eNB may accordingly transmit a presence signal at the beginning of the subframe which may indicate to the UE that the eNB is able to use the channel (and thus a poor DRS is related to the radio link rather than the LBT). Thus, in some embodiments, in-sync measurements may be performed on all valid DL subframes on the anchor channel and non-anchor channel, while out-of-sync measurements may be performed on the anchor channel and non-anchor channel after detecting the presence detection sequence. In other embodiments, out-of-sync measurements may be performed only on the anchor channel.

Figure 9:
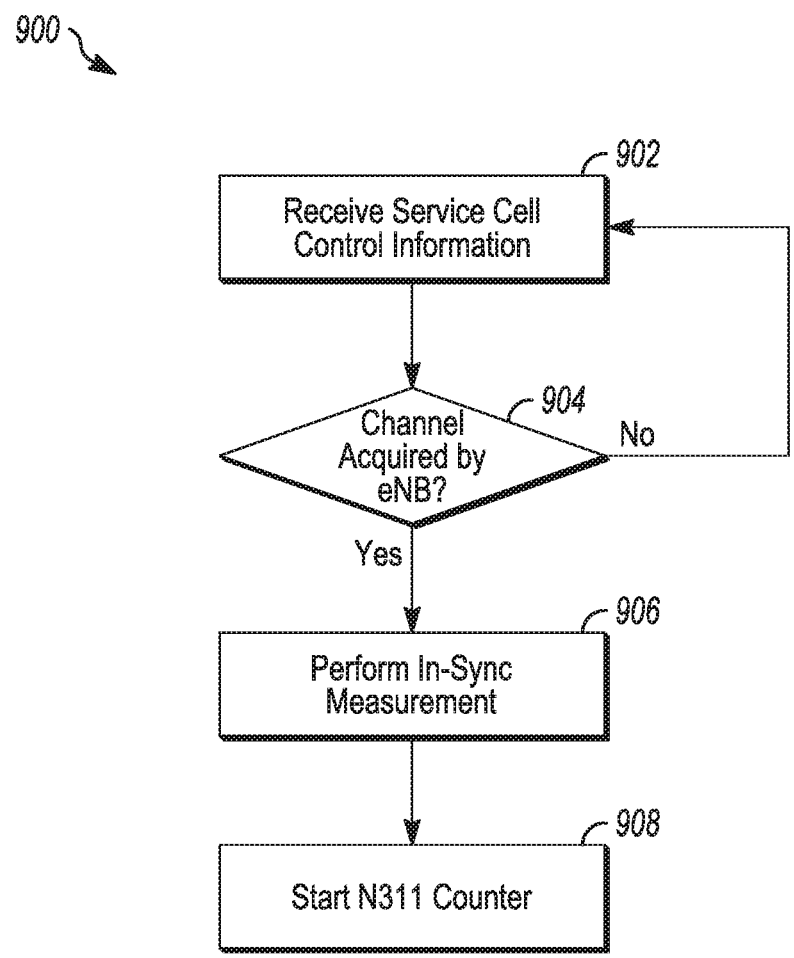
FIG. 9 illustrates operations for performing an in-sync measurement in accordance with some embodiments.

FIG. 9 illustrates operations for performing an in-sync measurement in accordance with some embodiments. For convenience, the flowchart 900 shown in FIG. 9 may not show all operations performed by the UE. To perform an in-sync measurement for eMTC-U, the UE may perform an RLM measurement on both the anchor channel and the non-anchor channel. This may enable faster in-sync measurements to be obtained. The UE may undertake several operations.

At operation 902, the UE may receive control information from the serving cell. The control information may be transmitted by the eNB on the anchor channel. In some embodiments, the UE may acquire the hopping sequence (or list) and a valid DL subframe configuration, and SIB-1 scheduling information from the serving cell eNB. In addition, the UE may acquire the hopping channel whitelist if the eNB performs non-LBT-based frequency adaptive hopping.

At operation 904, the UE may detect whether a non-anchor channel has been or has not been acquired by eNB. The UE may detect the presence through detection of a presence signal or CRS during the valid DL subframes indicated in the control information.

When the non-anchor channel has been acquired by eNB, and there is an on-going transmission, the UE may perform an in-sync measurement at operation 906. The in-sync measurement may be similar to that taken using LTE channels.

At operation 908, the UE may start the N311 counter if the in-sync threshold is met. The N311 counter indicates the number of 100 ms intervals that the UE, which is out-of-sync, is to successfully decode the PDCCH (i.e., a valid in-sync indication) to be back in-synch with the eNB. In some cases, the UE may determine that it is out-of-sync. In response to determining that the UE is out-of-sync, the UE may start the T310 timer when N310 consecutive out-of-sync indications are determined. The UE may stop the T310 timer when N311 consecutive in-sync indications are determined. If the T310 timer expires, the UE may determine that radio link failure (RLF) has occurred and enter the RRC Idle state.

Figure 10:
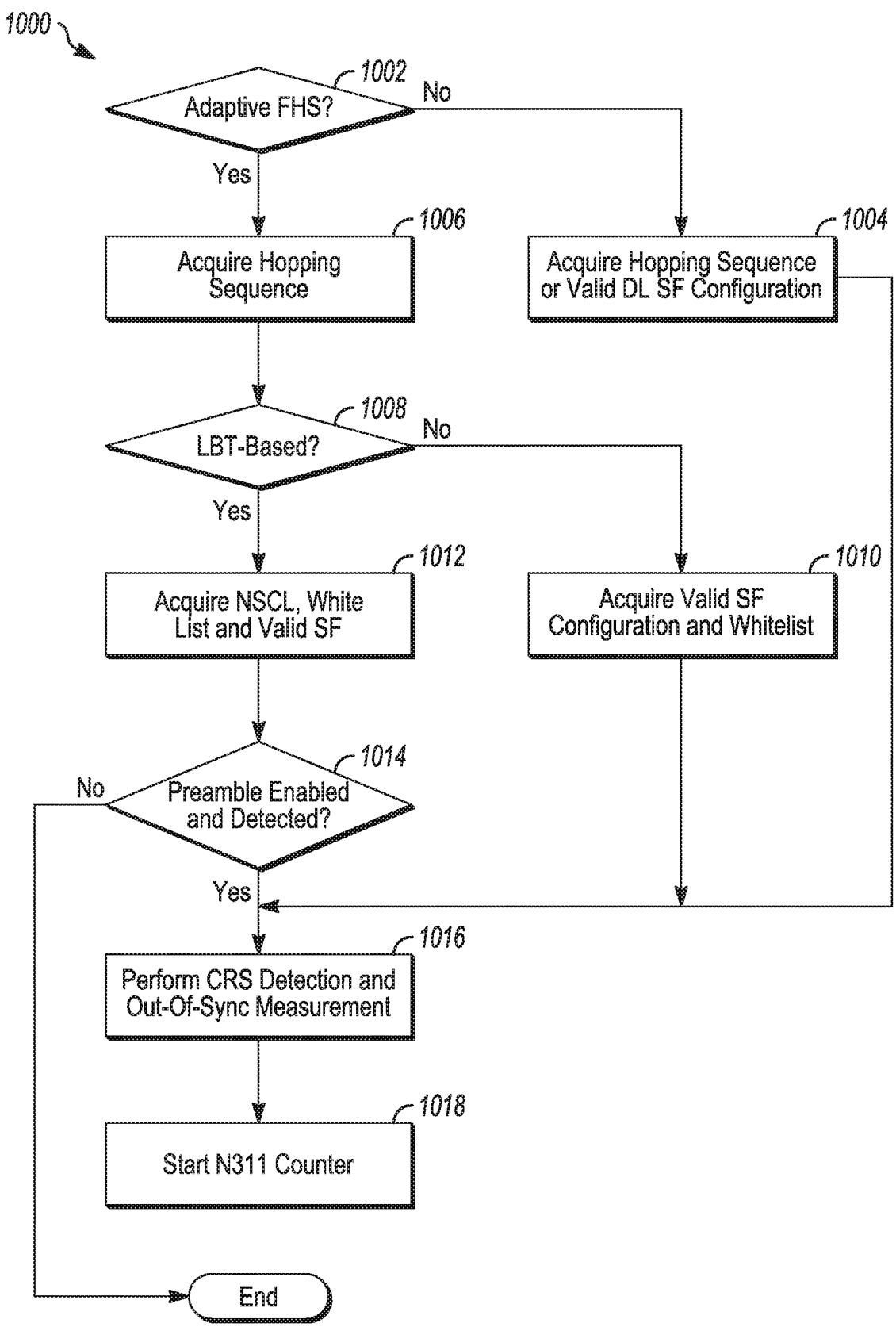
FIG. 10 illustrates operations for performing an out-of-sync measurement in accordance with some embodiments.

FIG. 10 illustrates operations for performing an out-of-sync measurement in accordance with some embodiments. For convenience, the flowchart 1000 shown in FIG. 10 may not show all operations performed by the UE. As above, the out-of-sync measurement may be performed on the anchor channel only or on both the anchor channel and the non-anchor channel, the latter of which may enable faster RLF detection. Specifics of the operations depend on whether the system is a non-adaptive frequency hopping system or an adaptive frequency hopping system, and, in the latter case, whether or not the adaptive frequency hopping system is LBT-based.

In particular, if at operation 1002 the system is a non-adaptive frequency hopping system, the UE may at operation 1004 acquire the hopping sequence/list or valid downlink subframe configuration (the period of downlink transmission) from the serving cell eNB.

After having obtained the information, the UE may perform an CRS detection at operation 1016. The CRS on the anchor and non-anchor channel may be used by the UE for the Qout measurement.

At operation 1018, the UE may start the N310 counter if the L1 out-of-sync threshold is met. The N310 counter indicates the number of times the UE is unable to successfully decode the PDCCH due to low RSRP. In some embodiments, the parameter indicates the number of times that the UE, which is in sync, cannot successfully decode N310 consecutive times in the downlink (i.e., a valid out-of-sync indication) before a determination that the UE is out-of-sync.

When the system is an adaptive frequency hopping system, the UE may at operation 1006 acquire the hopping sequence/list. The UE may acquire different control information dependent on whether or not the adaptive frequency hopping system is LBT-based at operation 1008.

If the system is a non-LBT-based adaptive frequency hopping system, like the non-adaptive frequency hopping system, the control information from the eNB also contain a valid DL subframe configuration. The UE, at operation 1010, may acquire the valid DL subframe configuration as well as an available hopping channel whitelist. The UE may then continue to operation 1016, using the CRS on the anchor and data channel, as shown.

If the system is a LBT-based adaptive frequency hopping system, the control information from the eNB also contain a non-skipped channel list, in addition to the whitelist, the valid DL subframe configuration, and SIB-1 scheduling information. The UE may acquire the non-skipped channel list at operation 1012.

In the LBT-based adaptive frequency hopping system, a preamble sequence may be enabled in the PHY design. In this case, the preamble sequence may be transmitted before the DL transmission (PDCCH). The UE may then, at operation 1014, perform preamble detection. The UE may perform a Qout measurement only after valid preamble sequence is detected. If a valid preamble sequence is detected, the UE may then continue to operation 1016, as shown.

In another embodiment, Qout measurement may only occur on the anchor channel, similar to MF1.0. In this case, if the UE misses the DRS due to the LBT operation, the missing DRS may be treated using BLER weighting. The exact weighting may be up to the UE implementation.

In addition to measurement by the UE, the UE may also transmit a sounding reference signal (SRS) to allow the eNB to estimate the channel quality for scheduling and channel selection. In the eMTC system, the SRS is designed within up to 96 physical resource blocks (PRBs) and the last Orthogonal frequency division multiplexing (OFDM) symbol of specific subframes. The information element (IE) SoundingRS-UL-Config may be used to specify the uplink SRS configuration for periodic and aperiodic sounding. Tus SRS may be supported in eMTC-U. In some embodiments, the SRS period is at least 5 ms and the location of the SRS may be (SF_mod 5)=4. In some embodiments the SRS may override the PUSCH, may follow LTE for 1.4 MHz of 4 RBs and have a period of at ost 320 ms. In some embodiments, the PUSCH may continue after SRS resources without any additional gaps (other than the SRS symbol). The following information elements may be used for the SRS:

```
--ASN1START
SoundingRS--UL--ConfigCommon : : =       CHOICE {
    release                                  NULL,
    setup                                    SEQUENCE {
        srs-BandwidthConfig                      ENUMERATED {bw0, bw1, bw2, bw3, bw4,
                                                     bw5, bw6, bw7},
        srs-SubframeConfig                       ENUMERATED {sc0, sc1, sc2, sc3, sc4, sc5, sc6, sc7,
                                             sc8, sc9, sc10, sc11, sc12, sc13, sc14, sc15},
                                                 ,
                                                 s}
    ackNackSRS-SimultaneousTransmission      BOOLEAN,
    srs-MaxUpPts                             ENUMERATED {true} OPTIONAL --
    Cond TDD
    }
}
SoundingRS-UL-ConfigDedicated : : =      CHOICE {
    release                                  NULL,
    setup                                    SEQUENCE {
        srs-Bandwidth                            ENUMERATED {bw0, bw1, bw2, bw3},
```

```
srs-HoppingBandwidth                            ENUMERATED {hbw0, hbw1, hbw2, hbw3},
freqDomainPosition                              INTEGER (0..23),
duration                                        BOOLEAN,
srs-ConfigIndex                                 INTEGER (0..1023),
transmissionComb                                INTEGER (0..1),
cyclicShift                                     ENUMERATED {cs0, cs1, cs2, cs3, cs4, cs5, cs6, cs7}
    }
}
SoundingRS-UL-ConfigDedicated v1020 : : =       SEQUENCE {
srs-AntennaPort-r10                                 SRS-AntennaPort
}
SoundingRS-UL-ConfigDedicatedAperiodic-r10 : : =    CHOICE {
release                                             NULL,
setup                                               SEQUENCE }
srs-ConfigIndexAp-r10                               INTEGER (0..31),
srs-ConfigApDCI-Format4-r10                         SEQUENCE (SIZE (1. .3) ) OF SRS- ConfigAp - r10
                                                    OPTIONAL---Need ON
srs-ActivateAp - r10                                CHOICE {
release                                             NULL,
setup                                               SEQUENCE {
srs-ConfigApDCI-Format0-r10                             SRS-ConfigAp – r10
srs-ConfigApDCI-Format1a2b2c – r10                      SRS-ConfigAp – r10
                   . . .
        }                                           OPTIONAL --
    }
Need ON
    }
}
SRS-ConfigAp-r10 : : = SEQUENCE{
    srs-AntennaPortAp-r10                       SRS-AntennaPort,
    srs-BandwidthAp-r10                         ENUMERATED {bw0, bw1, bw2, bw3},
    freqDomainPositionAp-r10                    INTEGER (0..23),
    transmissionCombAp-r10                      INTEGER (0..1),
    cyclicShiftAp-r10                           ENUMERATED {cs0, cs1, cs2, cs3, cs4, cs5, cs6, cs7}
}
```

In some embodiments, the srs-ConfigIndex, srs-ConfgIndexAp parameter may indicate $I_{SRS}$ for periodic and aperiodic SRS transmission respectively except for an LAA SCell. For MF BL/CE, $I_{SRS}$ is selected such that $I_{SRS} \geq 7$ and satisfies $(I_{SRS}-1) \bmod 5=4$.

In the embodiments described herein, the SRS design is described. The SRS design may include the SRS transmission, the subframe configuration and the resource allocation. In some embodiments, the SRS can reuse the srs-AntennaPort-r0, cyclicShift and freqDomainPosition IEs. In particular, these IEs may be enhanced for uplink channel quality estimation in eMTC-U systems.

Figure 11:
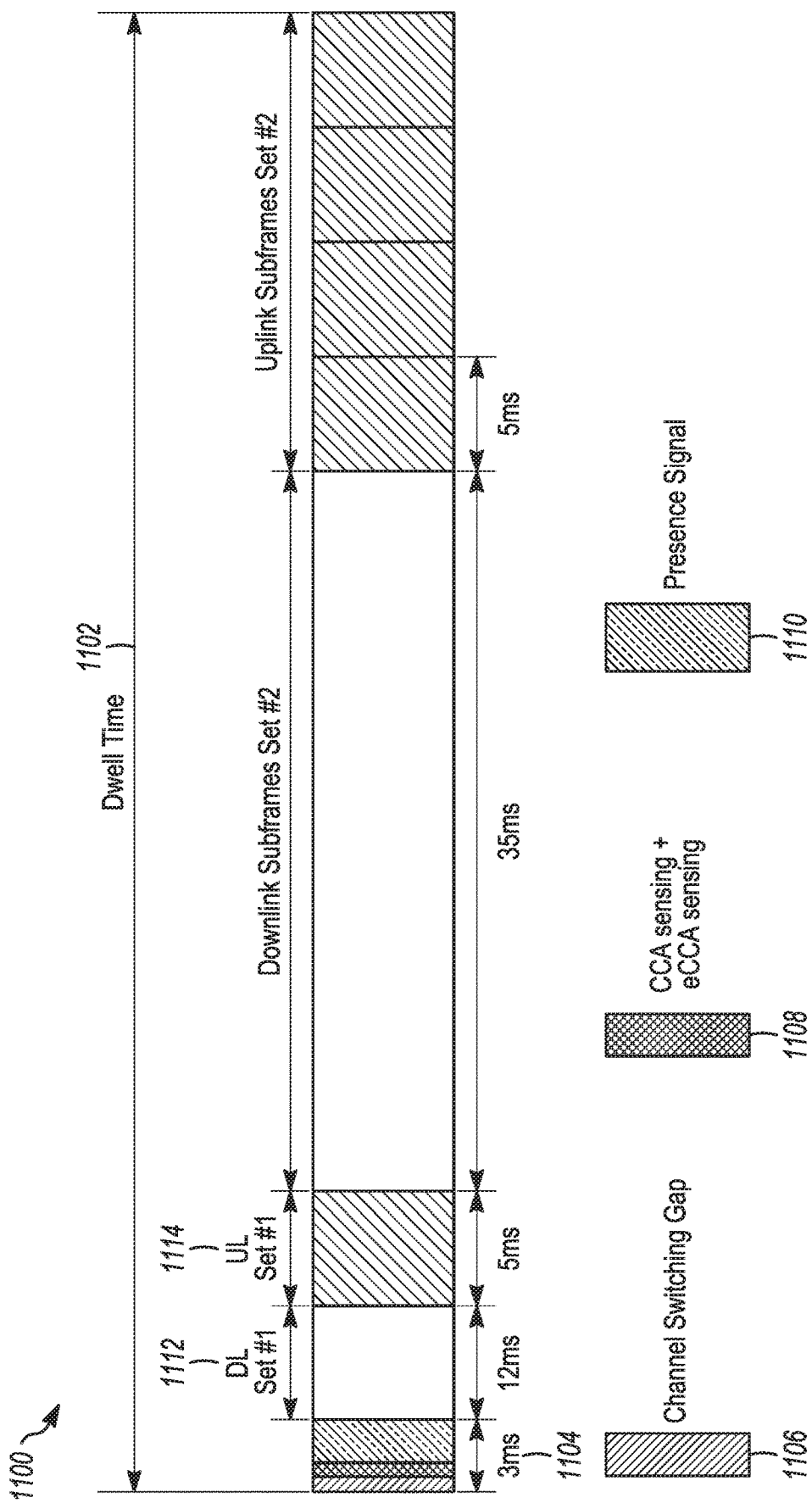
FIG. 11 illustrates an uplink and downlink set configuration in accordance with some embodiments.

In some embodiments, each measurement transmission may have fixed period (dwell time). In SIB-A, three bits may indicate the DL and UL configuration sets and their duration. FIG. 11 illustrates an uplink and downlink set configuration in accordance with some embodiments.

As shown in the transmission 1100 of FIG. 11, the dwell time 1102 may include multiple transmissions. The dwell time 1102 may include a first period 1104 that may include a channel switching gap 1106 (guard period for switching frequencies), the CCA and enhanced CCA (eCCA) 1108 and a presence signaling transmission 1110 (e.g., preamble) that may be, for example, 3 ms in duration. The first period 1104 may be followed by m sets of continuous DL subframes 1112 and m sets of continuous UL subframes 1114. The sets of DL subframes 1112 and UL subframes 1114 may be interleaved. In some embodiments, m may be configured by higher layers or predefined—for example, as shown in FIG. 11 m=2.

In some embodiments, each set of DL subframes 1112 and UL subframes 1114 may have independent numbers of subframes. Different sets of DL subframes 1112 or UL subframes 1114 can contain the same number of subframes or different number of subframes. The number of subframes in each set may be configured by higher layer signaling or predefined. As shown in FIG. 11, the first set of DL subframes 1112 may contain 12 subframes (12 ms) and the first set of UL subframes 1114 may contain 5 subframes (5 ms), while the second set of DL and UL subframes may be longer; as shown, the second set of DL subframes may contain 35 subframes (35 ms) and the second set of UL subframes may contain 20 subframes (20 ms). In some embodiments, independent of the number of sets of DL and UL subframes, the total duration of the non-anchor channel may be set to 75 ms.

In some embodiments. CCA/eCCA may be performed before each set of continuous subframes. In this case, the channel occupancy time may be calculated including DL subframes within this set, and/or UL subframes within this set before each set of continuous DL subframes. In other embodiments, such as that shown in FIG. 11, CCA/eCCA may be performed per channel. In this case, the channel occupancy time may be calculated until the last DL subframe on the channel, and/or UL subframes before the last DL set.

In some embodiments, a channel state information reference signal (CSIRS) can be transmitted in the beginning n1 DL sets 1112, where n1 is configured by higher layers or predefined. e.g. 1. Other transmissions, such as the SRS, scheduling request (SR) and physical uplink control channel (PUCCH) can be transmitted in the beginning n2 UL sets corresponding to the DCI.

Measurements may be made of the uplink and downlink set configuration shown in FIG. 11. FIG. 12A illustrates downlink channel measurement in accordance with some embodiments, while FIG. 12B illustrates uplink channel measurement in accordance with some embodiments. As shown in FIG. 12A, the CSI-RS may be transmitted in the first set of DL subframes 1202. The CSI-RS may be used for downlink channel measurement. The channel quality indicator (CQI) report may be transmitted to the eNB in a PUCCH during the first set of UL subframes 1204. The eNB can utilize the reported CQI for downlink scheduling in a later downlink set 1206.

As shown in FIG. 12B, the SRS may be transmitted by the UE in the first set of UL subframes 1212. In some embodiments, the SRS occasion can be before the PUCCH occasion. This may allow for processing delay for CQI derivation by the UE The eNB may use the SRS for UL channel measurement, estimating the uplink CQI based on the SRS. The eNB may use the estimate for transmission in the later DL set 1214 and for UL scheduling in the later UL set 1216. In some embodiments, downlink and uplink channel measurement may be avoided, leaving all transmissions to be open-loop.

Figure 13:
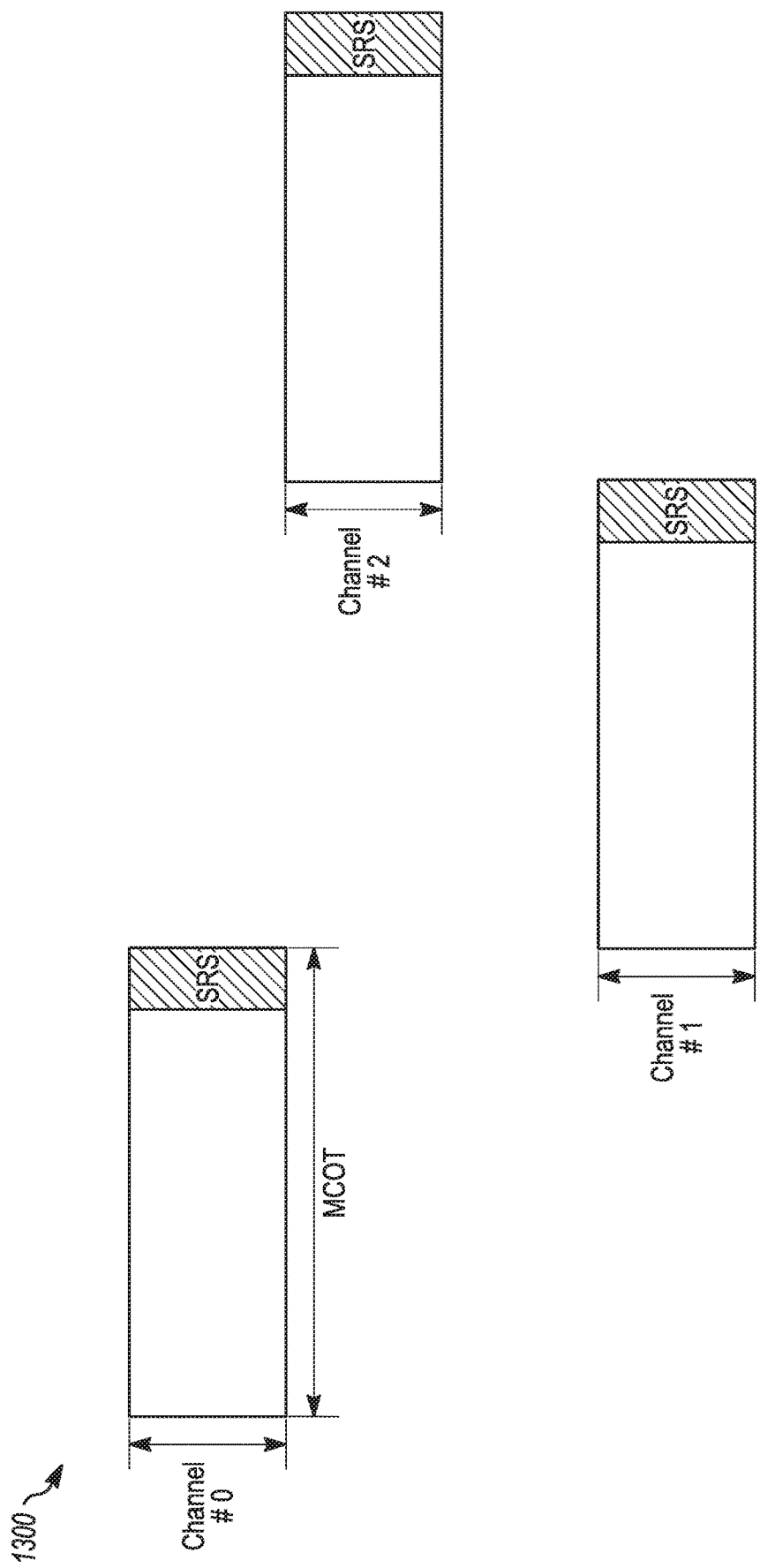
FIG. 13 illustrates a sounding reference signal (SRS) transmission in accordance with some embodiments.

In some embodiments, one SRS transmission for a specific UE can span m channels, n subframes, p symbols and q PRBs, where m, n, p and q are configured by higher layers or predefined. FIG. 13 illustrates a SRS transmission in accordance with some embodiments. The SRS 1300 may be transmitted on different channels at different times. The SRS transmission can be either periodic or aperiodic. Each mode (periodic or aperiodic) can be configured by individual parameters set by the eNB through higher layer (RRC) signaling.

In some embodiments, the SRS may only be transmitted within valid UL subframes. As above, valid UL and DL subframes may be configured by the eNB through a bitmap in a SIB. The bitmap may be periodically updated, based on downlink and uplink traffic load. Thus, the SRS may be dropped if the SRS is a downlink subframe. In various embodiments, the SRS may be limited to being transmitted only on a data (non-anchor) channel or may be transmitted on both anchor and data channels.

When the SRS transmission is periodic, the duration of the SRS transmission may be a single transmission or continuous transmissions (indefinite) until disabled by higher layers. In this case, a legacy UE-specific parameter duration can be reused to indicate the MF SRS duration. The UE-specific SRS periodicity and subframe offset may be configured by the eNB through higher layers. Legacy parameter sets can be reused with some modifications.

When the SRS transmission is aperiodic, the SRS may be transmitted after a DCI trigger. In some embodiments, the trigger may be carried in DCI 6-0A. In some embodiments, the SRS may be transmitted in the subframes derived by the UE-specific SRS periodicity and subframe offset. Alternatively, the SRS may be transmitted in the (n+m)th subframe after the DCI, which is transmitted in the nth subframe, where m is a cell specific parameter defined by eNB through higher layers, e.g. 4. Or, the SRS may be transmitted in the (n+m)th subframe, where n is the first valid uplink subframe or the last valid downlink subframe in one dwell time on one channel, and m is to the offset. The values n and m may be configured using the DCI. In some embodiments, the SRS may be transmitted in the last uplink subframe within one dwell time on one channel, as the last subframe is a valid UL subframe. In some embodiments, the SRS is transmitted in SF mod 5=4.

In some embodiments, only one SRS parameter set is configured by the eNB through higher layer signaling, regardless of the DCI format. An example of the SRS request field is shown in Table 1 (from the SRS triggering bit). As indicated, a single bit may be used for the SRS trigger.

TABLE 1

| Value of SRS request field | Description |
| --- | --- |
| '0' | No SRS trigger |
| '1' | SRS trigger |

Figure 14:
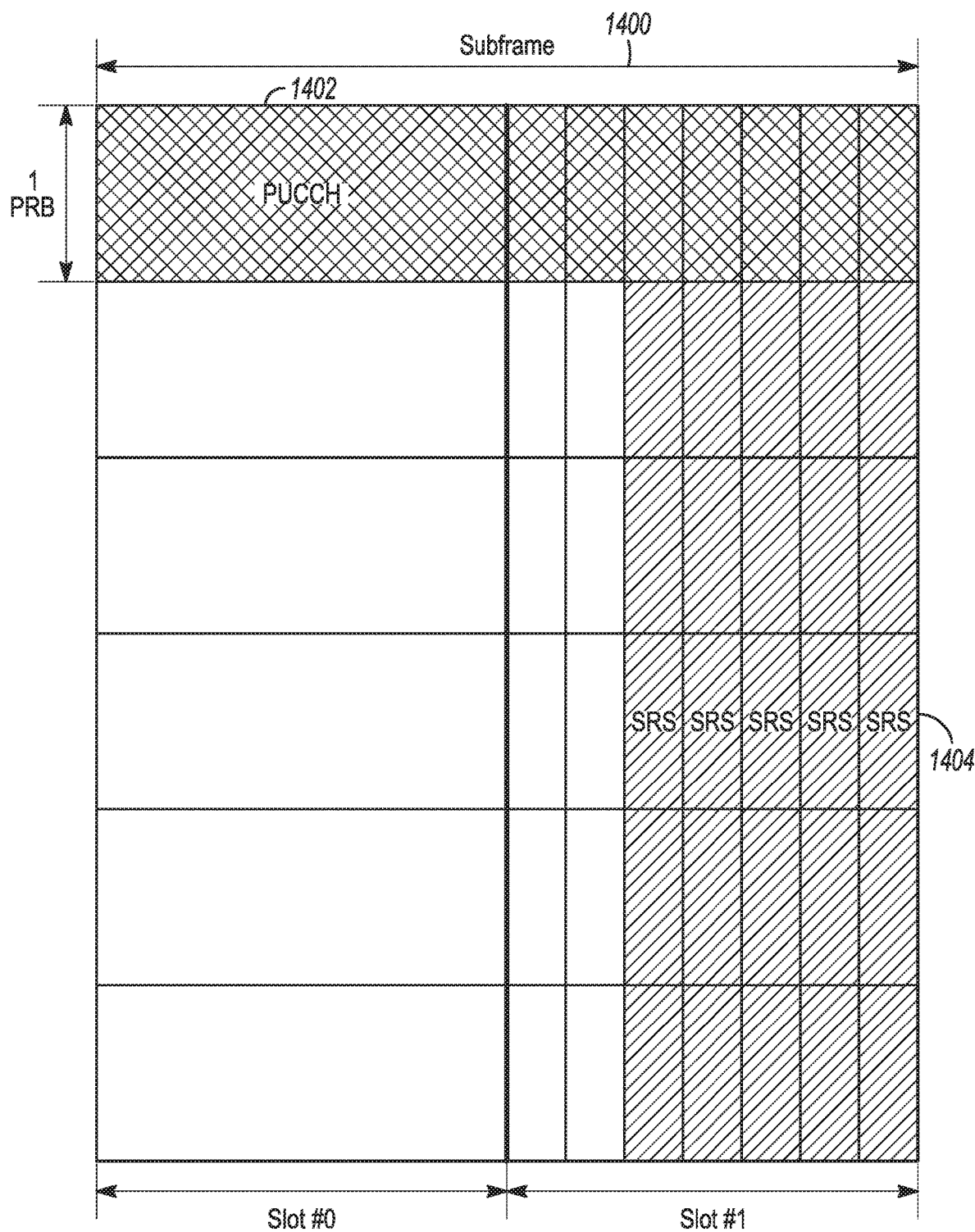
FIG. 14 illustrates a subframe in accordance with some embodiments.

In some embodiments, the SRS may be extended to several symbols or subframes by using an orthogonal cover code (OCC), e.g. 5. In some embodiments, the SRS may be transmitted in the same subframe with a PUCCH. FIG. 14 illustrates a subframe in accordance with some embodiments. The subframe 1400 may include a PUCCH 1402 transmitted in a PRB of both slots of the subframe 1400 and the SRS 1404 transmitted in some of the symbols of the last slot of the subframe 1400.

The legacy parameter ackNackSRS-SimultaneousTransmission may be used to control the simultaneous transmission (only permitted if the ackNackSRS-Simultaneous-Transmission IE is set to TRUE). For example, if the ackNackSRS-SimultaneousTransmission IE is set to TRUE the UE may transmit the SRS 1404 when the SRS transmission 1404 and a PUCCH transmission 1402 carrying a HARQ-ACK and/or SR using shortened PUCCH format coincide, in which case, the UE may transmit a shortened PUCCH format where the HARQ-ACK or the SR symbol corresponding to the SRS location is punctured.

In some embodiments, the PUCCH and SRS may be orthogonal in frequency domain. In this case, the SRS can span different subframes by either OCC or repetition.

Figure 15A:
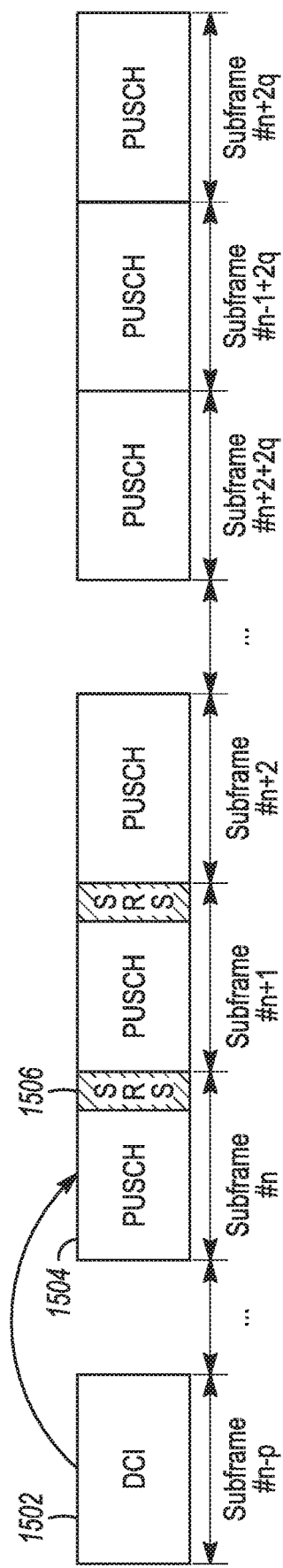
FIGS. 15A-15C illustrate SRS transmission patterns in accordance with some embodiments.
Figure 15B:
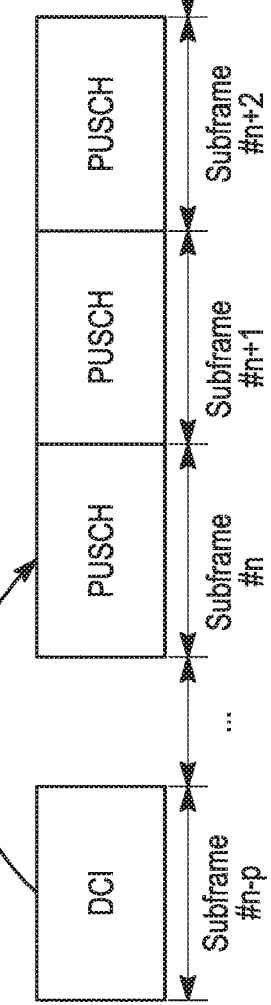
Figure 15C:
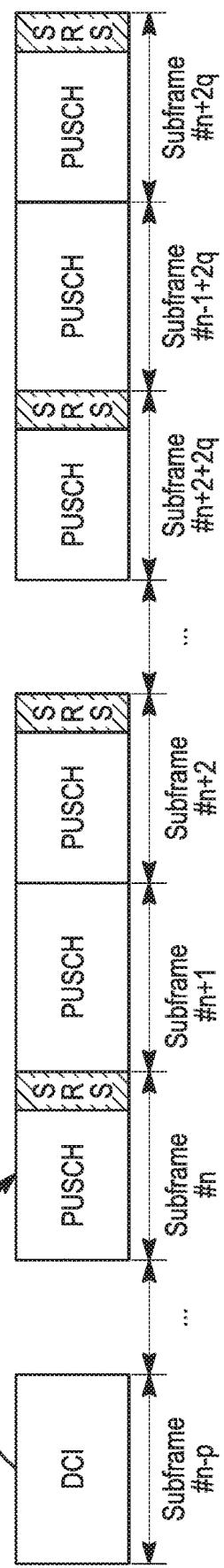

In some embodiments, the SRS may be transmitted in the same subframe with PUSCH. FIGS. 15A-15C illustrate SRS transmission patterns in accordance with some embodiments. The SRS transmission 1506 may be indicated by an aperiodic trigger in a DCI 1502 of a subframe prior to the SRS transmission 1506. The aperiodic trigger may indicate, e.g. "1" for SRS transmission, and "0" for no-SRS transmission.

In continuous PUSCH transmission subframes, the SRS 1506 may be localized or distributed. In a localized pattern, the SRS 1506 may be transmitted in the first n subframes, the last n subframes, or n continuous subframes among PUSCH subframes 1504, e.g. 4. In a distributed pattern, the SRS 1506 may be scattered in PUSCH subframes 1504 with the interval of m subframes. M and n may be configured by higher layers or may have fixed values. In particular, FIG. 15A illustrates an embodiment in which the SRS 1506 is transmitted in the first 2 subframes of a set of downlink subframes containing a PUSCH 1504. In the embodiment shown in FIG. 15B, the SRS 1506 is transmitted in the last 2 subframes of the set of downlink subframes containing a PUSCH 1504. In the embodiment shown in FIG. 15C, the SRS 1506 is scattered over n subframes of the set of downlink subframes containing a PUSCH 1504.

Figure 16:
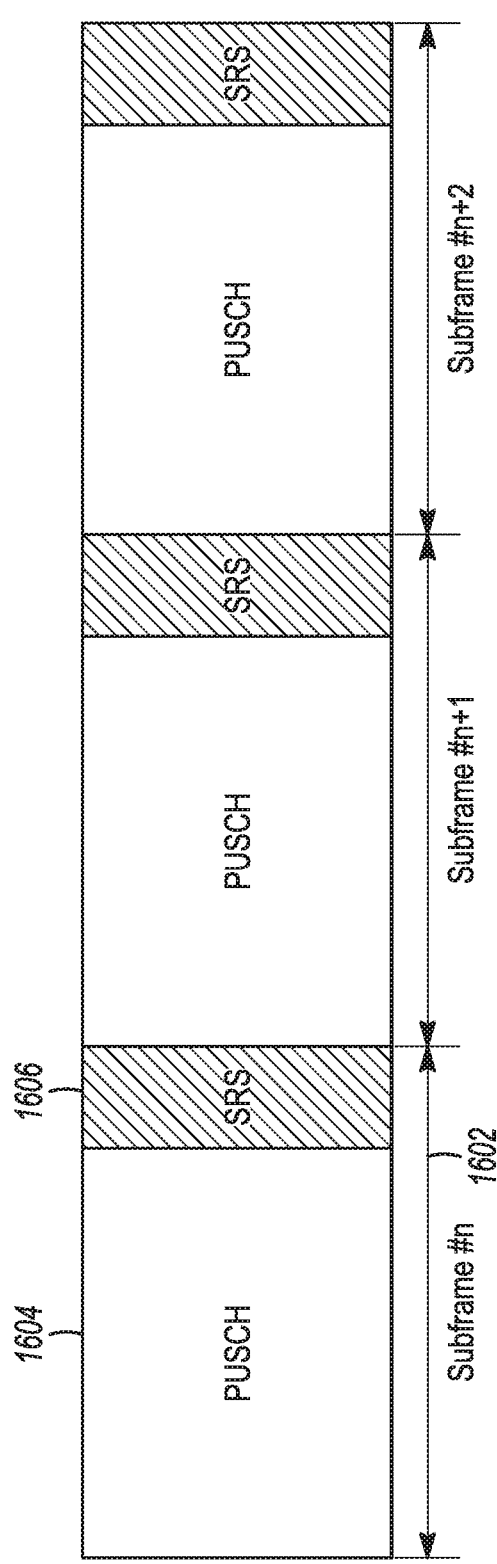
FIG. 16 illustrates subframes in accordance with some embodiments.

FIG. 16 illustrates subframes in accordance with some embodiments. The subframes shown in FIG. 16 may be similar to those of FIG. 15. In FIG. 16, the SRS 1606 may be transmitted in the last m symbols of the subframe 1602 in which the PUSCH 1604 is transmitted. The number of symbols m may be configured by the higher layers. M may take any value from 1-7, e.g. 1.

Figure 17:
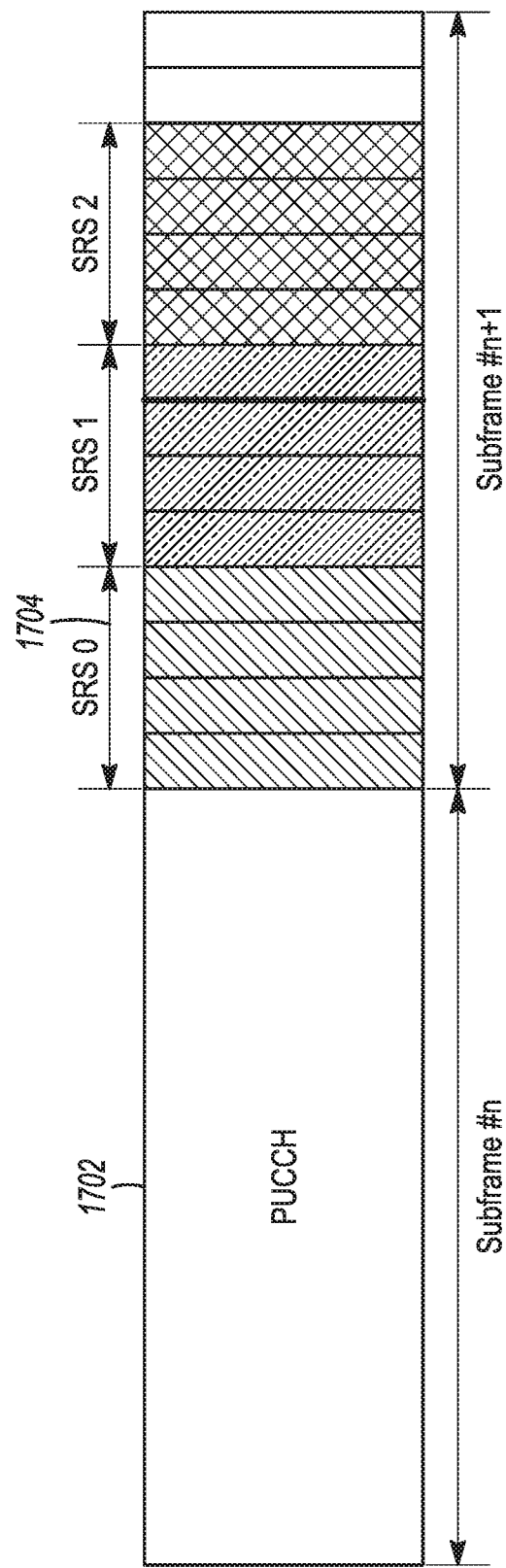
FIG. 17 illustrates subframes in accordance with some embodiments.

In some embodiments, the SRS may be unable to be transmitted in the same subframe with a PUSCH and PUCCH. FIG. 17 illustrates subframes in accordance with some embodiments. FIG. 17 shows a first subframe containing a PUCCH 1702 and a second subframe containing one or more SRSs 1704. The transmission duration of x ms (x subframes) may be set as a unit. The unit may contain uplink control related channels, e.g. SRS, PUCCH and SR. Similar to the above, x may be configured by higher layers or may be a fixed value, e.g. 5. The SRSs 1704 in the subframe containing one or more SRSs may be for different UEs. Different SRSs 1704 may be separated in the time domain and/or may be separated by using different OCCs.

Figure 18:
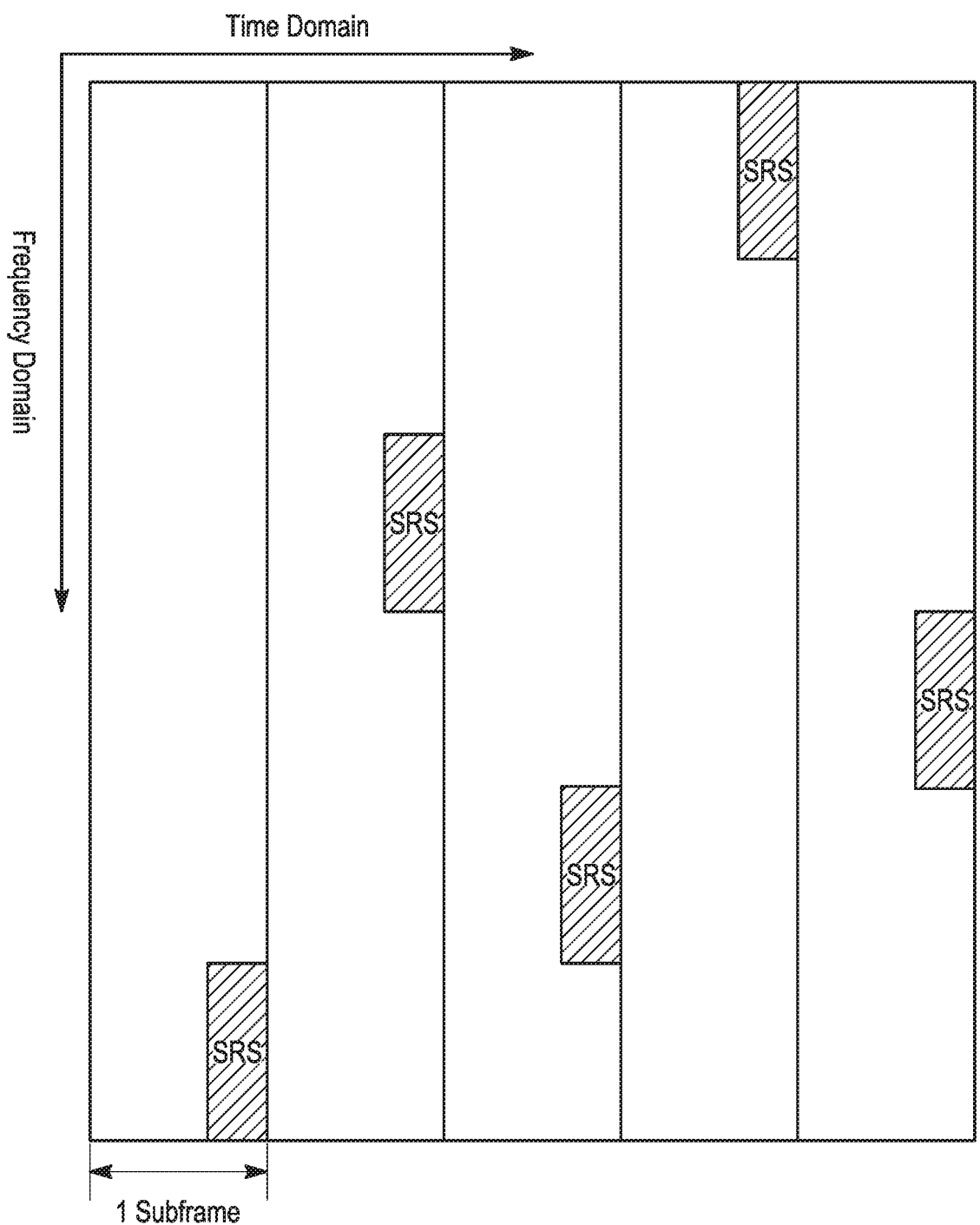
FIG. 18 illustrates subframes in accordance with some embodiments.

In some embodiments, SRS transmissions may be frequency hopped. FIG. 18 illustrates subframes in accordance with some embodiments. In the subframes of FIG. 18, the SRS transmissions 1802 may frequency hop over one or more subframes to different channels. The legacy parameter srs-HoppingBandwidth may be reused. The value of the srs-HoppingBandwidth IE may be smaller than that of the srs-Bandwidth IE to indicate channel hopping. Multiple narrowband SRS transmissions 1802 in continuous subframes may thus be combined to cover the whole band, as shown in FIG. 18.

In other embodiments, the SRS transmission may not frequency hop. That is, the SRS transmission may remain on the same channel and be transmitted only when the UE frequency hops to that channel. In other embodiments, the SRS may span multiple PRBs by repetition or OCC or sequence extension. When the SRS spans multiple PRBs, in some embodiments, different users may be frequency division multiplexed. Alternatively, the SRS may occupy a fixed (e.g., entire) bandwidth.

In some embodiments, the SRS can either reuse the legacy comb configuration or may occupy all subcarriers of the allocated PRBs. If the comb configuration is not used, the parameter transmissionComb may be removed from the legacy parameter sets. The transmissionComb IE may indicate whether the SRS is to be transmitted in every even or odd subcarrier in the assigned SRS bandwidth.

In some embodiments, the SRS can either be dropped or not dropped if retuning is used for channel hopping. If the SRS is not dropped, the SRS may not be transmitted in the last n symbols of the subframe, e.g. 2. As above, n may be configured by the eNB via higher layer signaling.

The eNB may use the SRS to provide uplink scheduling information to the UE. The UE may then transmit data on one or more of the non-anchor channels based on the SRS.

Thus, the eNB may perform a SRS transmission on either an anchor or data channel on a MF BL/CE cell, after first sensing the channel to be idle during a CCA for a certain period of time. If the channel during the CCA procedure is sensed to be busy, an eCCA can be performed, in which the channel is sensed for a randomly chosen period of time. If the eCCA is unsuccessful, then the eNB may perform another eCCA. The subsequent eCCA may use the same sensing time as the first, randomly selected value. The CCA/eCCA is successful, if the energy sensed during the duration of the eCCA is less than a specified energy detection threshold.

If the channel access procedure is successful before the start of OS2 in subframe n, then transmission may start immediately and a PD-RS transmission may begin in OS2 of subframe n, where 5≤n≤5+eCCA-Limit-numsfAF, where eCCA-Limit-nmsf-MF is a parameter signaled by higher layers.

EXAMPLES

Example 1 is an apparatus of enhanced MachineType Communication (eMTC) user equipment (UE), the apparatus comprising: processing circuitry arranged to: decode control information from an evolved NodeB (eNB) on an anchor channel, the anchor channel being in an unlicensed band, the control information comprising a whitelist, system information broadcast 1 (SIB1) scheduling information, and at least one of an uplink (UL) or downlink (DL) subframe configuration, the control information dependent on: whether the UE is configured for adaptive or non-adaptive frequency hopping and, when the UE is configured for adaptive frequency hopping, whether the UE is configured for listen-before-talk (LBT) adaptive frequency hopping; decode, based on the control information, reference signals on at least one of the anchor channel or a non-anchor channel, the non-anchor channel being in an unlicensed band, transmission of the reference signals configured to frequency hop as indicated by the control information; measure the reference signals for at least one of: radio resource monitoring (RRM) or in-sync or out-of-sync measurements, and wherein when the reference signals are measured for RRM, encode the measurements for transmission to the eNB for mobility management, and wherein when the reference signals are measured for the in-sync or out-of-sync measurements, determine from the in-sync or out-of-sync measurements whether an in- or out-of-sync indication is valid and start a counter in response to the valid in- or out-of-sync indication; encode a sounding reference signal (SRS) transmission for transmission to the eNB on the non-anchor channel; and decode, from the eNB, uplink scheduling information for data transmission on the non-anchor channel by the UE, the uplink scheduling information on the anchor channel and dependent on the SRS transmission; and a memory configured to store the control information for the eMTC-U UE.

In Example 2, the subject matter of Example 1 includes, wherein the processing circuitry is further arranged to: decode, as the reference signals, discovery reference signals (DRS) received on at least one anchor channel.

In Example 3, the subject matter of Example 2 includes, wherein the processing circuitry is further arranged to: perform mobility measurements based on the DRS, the DRS limited to reception on the at least one anchor channel.

In Example 4, the subject matter of Examples 1-3 includes, wherein in a synchronous network the processing circuitry is further arranged to: decode neighbor cell anchor channel periodicity and dwell time from the control information, wherein a measurement gap of the eNB is aligned with the neighbor cell anchor channel when the neighbor cell anchor channel dwell time is aligned with the eNB, a duration of the measurement gap is longer than combined length of a primary synchronization signal, a secondary synchronization signal and a physical broadcast channel (PBCH) signal in the neighbor cell anchor channel, and the reference signal measurements are taken from the neighbor cell anchor channel.

In Example 5, the subject matter of Examples 14 includes, wherein in a synchronous network the processing circuitry is further arranged to: decode neighbor cell anchor channel periodicity, dwell time and a measurement gap configuration from the control information, wherein the neighbor cell anchor channel dwell time is not aligned with the eNB, a duration of the measurement gap is longer than combined length of a primary synchronization signal, a secondary synchronization signal and a physical broadcast channel (PBCH) signal in the neighbor cell anchor channel, and the reference signal measurements are taken from the neighbor cell anchor channel based on the measurement gap configuration.

In Example 6, the subject matter of Examples 1-5 includes, wherein in an asynchronous network the processing circuitry is further arranged to: determine a measurement gap configuration from the control information and obtain a neighbor cell anchor channel periodicity and dwell time from a source other than the eNB, wherein a measurement gap slides in time with respect to the neighbor cell anchor channel, a duration of the measurement gap is longer than combined length of a primary synchronization signal, a secondary synchronization signal and a physical broadcast channel (PBCH) signal in the neighbor cell anchor channel, and the reference signal measurements are taken from the neighbor cell anchor channel based on the measurement gap configuration.

In Example 7, the subject matter of Examples 1-6 includes, wherein in a synchronous network the processing circuitry is further arranged to: determine a measurement gap configuration from the control information, the measurement gap configuration indicating measurement gap information and a neighbor cell non-anchor channel, wherein the reference signal measurements are taken from the neighbor cell non-anchor channel based on the measurement gap information.

In Example 8, the subject matter of Examples 1-7 includes, wherein the processing circuitry is further arranged to: determine measurement gap configuration from the control information, the measurement gap configuration indicating measurement gap information; and obtain, from a source other than the eNB, a hopping sequence for a neighbor cell non-anchor, wherein the reference signal measurements are taken from the neighbor cell non-anchor channel based on the measurement gap information.

In Example 9, the subject matter of Examples 1-8 includes, wherein the processing circuitry is further arranged to: perform the in-sync measurements on both the anchor and non-anchor channel.

In Example 10, the subject matter of Example 9 includes, wherein the processing circuitry is further arranged to: acquire a hopping channel whitelist from the eNB when the UE is configured for non-LBT-based frequency adaptive hopping, the control information comprising a hopping sequence: detect a Cell-Specific Reference Signal (CRS) or a preamble to detect a valid downlink transmission based on the hopping sequence; and start a N311 counter in response to a determination that the CRS has been received and that an in-sync indication is valid.

In Example 11, the subject matter of Examples 1-10 includes, wherein the processing circuitry is further arranged to, perform the out-of-sync measurements on the anchor channel and avoid performance of the out-of-sync measurements on the non-anchor channel: and weight a block error rate (BLER) estimation calculated using discovery reference signals (DRS) that are missed due to engagement in LBT during the out-of-sync measurements.

In Example 12, the subject matter of Examples 1-11 includes, wherein the processing circuitry is further arranged to: perform the out-of-sync measurements on both the anchor and non-anchor channel when the UE is configured for non-adaptive frequency hopping; acquire a hopping channel list from the eNB; detect and measure a Cell-Specific Reference Signal (CRS); and start a N310 counter in response to a determination that the CRS has been received and that an out-of-sync indication is valid.

In Example 13, the subject matter of Examples 1-12 includes, wherein the processing circuitry is further arranged to: perform the out-of-sync measurements on both the anchor and non-anchor channel when the UE is configured for non-LBT-based frequency adaptive hopping; acquire a hopping channel whitelist from the eNB; detect and measure a Cell-Specific Reference Signal (CRS); and start a N310 counter in response to a determination that the CRS has been received and that an out-of-sync indication is valid.

In Example 14, the subject matter of Examples 1-13 includes, wherein the processing circuitry is further arranged to: perform the out-of-sync measurements on both the anchor and non-anchor channel when the UE is configured for LBT-based frequency adaptive hopping; perform preamble detection to determine whether a LBT procedure is successful; detect and measure a Cell-Specific Reference Signal (CRS) in response to a successful preamble detection and start a N310 counter in response to a determination that the CRS has been received and that an out-of-sync indication is valid.

In Example 15, the subject matter of Examples 1-14 includes, wherein the processing circuitry is further arranged to: decode, from a bitmap in SIB information, a configuration indicating valid UL and DL subframes, the configuration updated timely dependent respectively on uplink and downlink traffic load; and determine whether the SRS transmission is periodic or aperiodic dependent on an individual parameter set received from the eNB through higher layer signaling, the SRS transmission limited to the valid UL subframes in the data channel and dropped if in the valid DL subframe.

In Example 16, the subject matter of Examples 1-15 includes, wherein the processing circuitry is further arranged to: decode, from higher layer signaling from the eNB, a configuration indicating SRS periodicity and subframe offset for periodic SRS transmission; determine from the configuration whether a SRS duration is single or indefinite until disabled by higher layers; and encode, for transmission to the eNB, one or more SRS transmissions as indicated by the SRS duration.

In Example 17, the subject matter of Examples 1-16 includes, wherein the processing circuitry is further arranged to: decode, from higher layer signaling from the eNB, a configuration indicating SRS periodicity and subframe offset for aperiodic SRS transmission: derive at least one subframe for the SRS transmission based on the configuration: decode, from the eNB, a physical downlink channel formed in accordance with downlink control information (DCI), the DCI indicating a trigger for the aperiodic SRS transmission; and encode, for transmission to the eNB, the aperiodic SRS transmission based on the configuration and the trigger.

In Example 18, the subject matter of Examples 1-17 includes, wherein the processing circuitry is further arranged to: decode, from higher layer signaling from the eNB, a configuration indicating timing for aperiodic SRS transmission; decode, from the eNB, a physical downlink control channel (PUCCH) formed in accordance with downlink control information (DCI), the DCI indicating a trigger for the aperiodic SRS transmission; and encode, for transmission to the eNB, the aperiodic SRS transmission based on the timing and the trigger, the timing of the aperiodic SRS transmission indicated by the configuration as one of a predetermined number of subframes after the DCI, or a first valid uplink subframe or last valid downlink subframe in a dwell time on a channel after an offset indicated in the configuration, or a last uplink subframe in the dwell time on the channel.

In Example 19, the subject matter of Examples 1-18 includes, wherein the processing circuitry is further arranged to: decode, from higher layer signaling from the eNB, a configuration indicating a single SRS parameter set in which a single bit is used to trigger the SRS transmission.

In Example 20, the subject matter of Examples 1-19 includes, wherein the processing circuitry is further arranged to: extend the SRS transmission to multiple subframes using an orthogonal cover code (OCC).

In Example 21, the subject matter of Examples 1-20 includes, wherein the processing circuitry is further arranged to: encode, for transmission to the eNB, the SRS transmission in a same subframe with a physical uplink control channel (PUCCH) transmission, wherein at least one of simultaneous transmission of the SRS transmission and the PUCCH transmission is controlled by a parameter ackNack-SRS-SimultaneousTransmission received by higher layer signaling, or the SRS transmission and the PUCCH transmission are orthogonal in frequency domain and the SRS transmission spans different subframes by either using an orthogonal cover code (OCC) or repetition.

In Example 22, the subject matter of Examples 1-21 includes, wherein the processing circuitry is further arranged to: encode, for transmission to the eNB, the SRS transmission in a same subframe with a physical uplink shared channel (PUSCH) transmission, wherein at least one of: simultaneous transmission of the SRS transmission and the PUSCH transmission is controlled by a parameter received by higher layer signaling, decode, from the eNB, a physical downlink control channel (PUCCH) formed in accordance with downlink control information (DCI), the DCI indicating an aperiodic trigger for the SRS transmission; the PUSCH transmission is in continuous PUSCH transmission subframes, and the SRS transmission: when localized is transmitted in a set of n continuous subframes among PUSCH subframes, and when distributed is scattered in PUSCH subframes with an interval of m subframes, where m and n are configured by higher layer signaling or are a fixed value, or the PUSCH transmission is in a last set of symbols of a PUSCH subframe, a number of the set of symbols configured by the higher layer signaling.

In Example 23, the subject matter of Examples 1-22 includes, wherein the processing circuitry is further arranged to, limit the SRS transmission to avoid transmission in a same subframe with a physical uplink shared channel (PUSCH) transmission and to avoid transmission in a same subframe with a physical uplink control channel (PUCCH) transmission, wherein at least one of: transmission of uplink control-related signals that include the PUCCH transmission, the SRS transmission and a scheduling request (SR) transmission have a duration of x ms configured by higher layer signaling, SRS transmissions for different UEs are transmitted in a same subframe, or different SRS transmissions are separated temporally or using different orthogonal cover codes (OCCs).

In Example 24, the subject matter of Examples 1-23 includes, wherein the processing circuitry is further arranged to: frequency hop the SRS transmission based on a parameter srs-HoppingBandwidth received in higher layer signaling, wherein an entire band is covered by a combination of multiple narrowband SRS transmissions in continuous subframes when the SRS transmission is a narrowband SRS transmission.

In Example 25, the subject matter of Examples 1-24 includes, wherein the processing circuitry is further arranged to: limit the SRS transmission to avoid frequency hopping, wherein one of: the SRS transmission spans multiple physical resource blocks using an orthogonal cover code (OCC), repetition or sequence extension as indicated by a srs-Bandwidth parameter received in higher layer signaling, different UEs being frequency multiplexed, or the SRS transmission occupies an entire band.

In Example 26, the subject matter of Examples 1-25 includes, wherein the processing circuitry is further arranged to: reuse a legacy comb configuration for the SRS transmission, or occupy all subcarriers of physical resource blocks allocated for the SRS transmission, a transmissionComb parameter removed from higher layer signaling from the eNB.

In Example 27, the subject matter of Examples 1-26 includes, wherein the processing circuitry is further arranged to: avoid dropping the SRS transmission when retuning for channel hopping, and avoid transmission of the SRS transmission in a last n symbols of an SRS subframe, where n is configured by eNB from the higher layers.

In Example 28, the subject matter of Examples 1-27 includes, wherein: the processing circuitry comprises a baseband processor configured to encode transmissions to, and decode transmissions from, the eNB.

Example 29 is an apparatus of a next generation evolved NodeB (gNB), the apparatus comprising: processing circuitry arranged to: encode, for transmission to an enhanced Machine Type Communication (eMTC) user equipment (UE), control information on an anchor channel, the anchor channel being in an unlicensed band, the control information comprising a uplink (UL) and downlink (DL) subframe configuration, the control information dependent on: whether the UE is configured for adaptive or non-adaptive frequency hopping and, when the UE is configured for adaptive frequency hopping, whether the UE is configured for listen-before-talk (LBT) adaptive frequency hopping; encode, for transmission to the UE, reference signals on at least one of the anchor channel or a non-anchor channel, the non-anchor channel being in an unlicensed band, transmission of the reference signals configured to frequency hop as indicated by the control information, the reference signals for measurement by the UE for at least one of: radio resource monitoring (RRM), or in-sync or out-of-sync measurements, wherein when the reference signals are for RRM, decode, from the UE, the measurements for mobility management, and wherein when the reference signals are for the in-sync or out-of-sync measurements, decode, from the UE, a radio resource control (RRC) connection request when a counter in the UE that counts valid in- or out-of-sync indication has reached a predetermined threshold; decode, from the UE, a Sounding Reference Signal (SRS) transmission on the non-anchor channel; and encode, to the UE, uplink scheduling information for data transmission on the non-anchor channel by the UE the uplink scheduling information on the anchor channel and dependent on the SRS transmission; and a memory configured to store the control information.

In Example 30, the subject matter of Example 29 includes, wherein the processing circuitry is further arranged to encode at least one of: a bitmap in a system information broadcast (SIB), the bitmap comprising a configuration indicating valid UL and DL subframes and updated timely dependent respectively on uplink and downlink traffic load, and higher layer signaling to the UE, the higher layer signaling comprising a parameter that indicates whether the SRS transmission is periodic or aperiodic, the SRS transmission limited to the valid UL subframes in the data channel and dropped if in the valid DL subframe, or higher layer signaling that comprises a configuration indicating SRS periodicity and subframe offset for periodic or aperiodic SRS transmission, and when the SRS transmission is the aperiodic SRS transmission, a physical downlink control channel formed in accordance with downlink control information (DCI), the DCI indicating a trigger for the aperiodic SRS transmission.

Example 31 is a computer-readable storage medium that stores instructions for execution by one or more processors of an enhanced Machine Type Communication (eMTC) user equipment (UE), the one or more processors to configure the UE to, when the instructions are executed: receive control information from an evolved NodeB (eNB) on an anchor channel, the anchor channel being in an unlicensed band, the control information comprising a uplink (UL) and downlink (DL) subframe configuration, the control information dependent on: whether the UE is configured for adaptive or non-adaptive frequency hopping and, when the UE is configured for adaptive frequency hopping, whether the UE is configured for listen-before-talk (LBT) adaptive frequency hopping; use the control information to receive reference signals on at least one of the anchor channel or a non-anchor channel, the non-anchor channel being in an unlicensed band; and measure the reference signals for at least one of: radio resource monitoring (RRM) or in-sync or out-of-sync measurements, and when the reference signals are for RRM, transmit the measurements to the eNB for mobility management, and when the reference signals are for the in-sync or out-of-sync measurements, determine from the in-sync or out-of-sync measurements whether an in- or out-of-sync indication is valid and start a counter in response to the valid in- or out-of-sync indication.

In Example 32, the subject matter of Example 31 includes, wherein instructions, when executed, further configure the UE to: transmit a sounding reference signal (SRS) transmission the eNB on the non-anchor channel, the control information comprising subframe configuration and resource allocation for SRS transmission.

Example 33 is at least one machine-readable medium including instructions that, when executed by processing circuitry, cause the processing circuitry to perform operations to implement of any of Examples 1-32.

Example 34 is an apparatus comprising means to implement of any of Examples 1-32.

Example 35 is a system to implement of any of Examples 1-32.

Example 36 is a method to implement of any of Examples 1-32.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus of enhanced Machine Type Communication (eMTC) user equipment (UE), the apparatus comprising:
    processing circuitry arranged to:
        decode control information from an evolved NodeB (eNB) on an anchor channel, the anchor channel being in an unlicensed band, the control information comprising a whitelist, system information broadcast 1 (SIB1) scheduling information, and at least one of an uplink (UL) or downlink (DL) subframe configuration, the control information dependent on:
            whether the UE is configured for adaptive or non-adaptive frequency hopping and,
            when the UE is configured for adaptive frequency hopping, whether the UE is configured for listen-before-talk (LBT) adaptive frequency hopping;
        decode, based on the control information, reference signals on at least one of the anchor channel or a non-anchor channel, the non-anchor channel being in an unlicensed band, transmission of the reference signals configured to frequency hop as indicated by the control information;
        measure the reference signals for at least one of:
            radio resource monitoring (RRM) or
            in-sync or out-of-sync measurements, and
        wherein when the reference signals are measured for RRM, encode the measurements for transmission to the eNB for mobility management, and
        wherein when the reference signals are measured for the in-sync or out-of-sync measurements, determine from the in-sync or out-of-sync measurements whether an in- or out-of-sync indication is valid and start a counter in response to the valid in- or out-of-sync indication;
        encode a sounding reference signal (SRS) transmission for transmission to the eNB on the non-anchor channel; and
        decode, from the eNB, uplink scheduling information for data transmission on the non-anchor channel by the UE, the uplink scheduling information on the anchor channel and dependent on the SRS transmission; and
    a memory configured to store the control information for the eMTC-U UE.

2. The apparatus of claim 1, wherein the processing circuitry is further arranged to:
    decode, as the reference signals, discovery reference signals (DRS) received on at least one anchor channel; and
    perform mobility measurements based on the DRS, the DRS limited to reception on the at least one anchor channel.

3. The apparatus of claim 1, wherein in a synchronous network the processing circuitry is further arranged to:

decode neighbor cell anchor channel periodicity and dwell time from the control information, wherein a measurement gap of the eNB is aligned with the neighbor cell anchor channel when the neighbor cell anchor channel dwell time is aligned with the eNB, a duration of the measurement gap is longer than combined length of a primary synchronization signal, a secondary synchronization signal and a physical broadcast channel (PBCH) signal in the neighbor cell anchor channel, and the reference signal measurements are taken from the neighbor cell anchor channel.

4. The apparatus of claim 1, wherein in a synchronous network the processing circuitry is further arranged to:

decode neighbor cell anchor channel periodicity, dwell time and a measurement gap configuration from the control information, wherein the neighbor cell anchor channel dwell time is not aligned with the eNB, a duration of the measurement gap is longer than combined length of a primary synchronization signal, a secondary synchronization signal and a physical broadcast channel (PBCH) signal in the neighbor cell anchor channel, and the reference signal measurements are taken from the neighbor cell anchor channel based on the measurement gap configuration.

5. The apparatus of claim 1, wherein in an asynchronous network the processing circuitry is further arranged to:

determine a measurement gap configuration from the control information and obtain a neighbor cell anchor channel periodicity and dwell time from a source other than the eNB, wherein a measurement gap slides in time with respect to the neighbor cell anchor channel, a duration of the measurement gap is longer than combined length of a primary synchronization signal, a secondary synchronization signal and a physical broadcast channel (PBCH) signal in the neighbor cell anchor channel, and the reference signal measurements are taken from the neighbor cell anchor channel based on the measurement gap configuration.

6. The apparatus of any one or more of claim 1, wherein in a synchronous network the processing circuitry is further arranged to:

determine a measurement gap configuration from the control information, the measurement gap configuration indicating measurement gap information and a neighbor cell non-anchor channel, wherein the reference signal measurements are taken from the neighbor cell non-anchor channel based on the measurement gap information.

7. The apparatus of claim 1, wherein the processing circuitry is further arranged to:

determine measurement gap configuration from the control information, the measurement gap configuration indicating measurement gap information; and obtain, from a source other than the eNB, a hopping sequence for a neighbor cell non-anchor, wherein the reference signal measurements are taken from the neighbor cell non-anchor channel based on the measurement gap information.

8. The apparatus of claim 1, wherein the processing circuitry is further arranged to:

perform the in-sync measurements on both the anchor and non-anchor channel;

acquire a hopping channel whitelist from the eNB when the UE is configured for non-LBT-based frequency adaptive hopping, the control information comprising a hopping sequence;

detect a Cell-Specific Reference Signal (CRS) or a preamble to detect a valid downlink transmission based on the hopping sequence; and start a N311 counter in response to a determination that the CRS has been received and that an in-sync indication is valid.

9. The apparatus of claim 1, wherein the processing circuitry is further arranged to:

perform the out-of-sync measurements on the anchor channel and avoid performance of the out-of-sync measurements on the non-anchor channel; and weight a block error rate (BLER) estimation calculated using discovery reference signals (DRS) that are missed due to engagement in LBT during the out-of-sync measurements.

10. The apparatus of claim 1, wherein the processing circuitry is further arranged to:

perform the out-of-sync measurements on both the anchor and non-anchor channel when the UE is configured for non-adaptive frequency hopping;

acquire a hopping channel list from the eNB;

detect and measure a Cell-Specific Reference Signal (CRS); and start a N310 counter in response to a determination that the CRS has been received and that an out-of-sync indication is valid.

11. The apparatus of claim 1, wherein the processing circuitry is further arranged to:

perform the out-of-sync measurements on both the anchor and non-anchor channel when the UE is configured for at least one of LBT-based frequency adaptive hopping or non-LBT-based frequency adaptive hopping; and at least one of:

if the UE is configured for non-LBT-based frequency adaptive hopping: acquire a hopping channel whitelist from the eNB; detect and measure a Cell-Specific Reference Signal (CRS); and start a N310 counter in response to a determination that the CRS has been received and that an out-of-sync indication is valid; or if the UE is configured for LBT-based frequency adaptive hopping: perform preamble detection to determine whether an LBT procedure is successful; detect and measure the CRS in response to a successful preamble detection; and start the N310 counter in response to a determination that the CRS has been received and that an out-of-sync indication is valid.

12. The apparatus of claim 1, wherein the processing circuitry is further arranged to:

decode, from a bitmap in SIB information, a configuration indicating valid UL and DL subframes, the configuration updated timely dependent respectively on uplink and downlink traffic load; and determine whether the SRS transmission is periodic or aperiodic dependent on an individual parameter set received from the eNB through higher layer signaling, the SRS transmission limited to the valid UL subframes in the data channel and dropped if in the valid DL subframe.

13. The apparatus of claim 1, wherein the processing circuitry is further arranged to:

decode, from higher layer signaling from the eNB, a configuration indicating SRS periodicity and subframe offset for at least one of periodic or aperiodic SRS transmission; and at least one of:
if the configuration indicates SRS periodicity and subframe offset for periodic SRS transmission: determine from the configuration whether an SRS duration is single or indefinite until disabled by higher layers; and encode, for transmission to the eNB, one or more SRS transmissions as indicated by the SRS duration; or
if the configuration indicates SRS periodicity and subframe offset for aperiodic SRS transmission: derive at least one subframe for the SRS transmission based on the configuration;
decode, from the eNB, a physical downlink channel formed in accordance with downlink control information (DCI), the DCI indicating a trigger for the aperiodic SRS transmission; and encode, for transmission to the eNB, the aperiodic SRS transmission based on the configuration and the trigger.

14. The apparatus of claim 1, wherein the processing circuitry is further arranged to:
decode, from higher layer signaling from the eNB, a configuration indicating timing for aperiodic SRS transmission;
decode, from the eNB, a physical downlink control channel (PUCCH) formed in accordance with downlink control information (DCI), the DCI indicating a trigger for the aperiodic SRS transmission; and
encode, for transmission to the eNB, the aperiodic SRS transmission based on the timing and the trigger, the timing of the aperiodic SRS transmission indicated by the configuration as one of:
a predetermined number of subframes after the DCI, or
a first valid uplink subframe or last valid downlink subframe in a dwell time on a channel after an offset indicated in the configuration, or
a last uplink subframe in the dwell time on the channel.

15. The apparatus of claim 1, wherein the processing circuitry is further arranged to:
encode, for transmission to the eNB, the SRS transmission in a same subframe with a physical uplink control channel (PUCCH) transmission,
wherein at least one of:
simultaneous transmission of the SRS transmission and the PUCCH transmission is controlled by a parameter ackNackSRS-SimultaneousTransmission received by higher layer signaling, or
the SRS transmission and the PUCCH transmission are orthogonal in frequency domain and the SRS transmission spans different subframes by either using an orthogonal cover code (OCC) or repetition.

16. The apparatus of claim 1, wherein the processing circuitry is further arranged to:
encode, for transmission to the eNB, the SRS transmission in a same subframe with a physical uplink shared channel (PUSCH) transmission,
wherein at least one of:
simultaneous transmission of the SRS transmission and the PUSCH transmission is controlled by a parameter received by higher layer signaling,
decode, from the eNB, a physical downlink control channel (PUCCH) formed in accordance with downlink control information (DCI), the DCI indicating an aperiodic trigger for the SRS transmission;
the PUSCH transmission is in continuous PUSCH transmission subframes, and the SRS transmission: when localized is transmitted in a set of n continuous subframes among PUSCH subframes, and when distributed is scattered in PUSCH subframes with an interval of m subframes, where m and n are configured by higher layer signaling or are a fixed value, or
the PUSCH transmission is in a last set of symbols of a PUSCH subframe, a number of the set of symbols configured by the higher layer signaling.

17. An apparatus of a next generation evolved NodeB (gNB), the apparatus comprising:
processing circuitry arranged to:
encode, for transmission to an enhanced Machine Type Communication (eMTC) user equipment (UE), control information on an anchor channel, the anchor channel being in an unlicensed band, the control information comprising a uplink (UL) and downlink (DL) subframe configuration, the control information dependent on:
whether the UE is configured for adaptive or non-adaptive frequency hopping and,
when the UE is configured for adaptive frequency hopping, whether the UE is configured for listen-before-talk (LBT) adaptive frequency hopping;
encode, for transmission to the UE, reference signals on at least one of the anchor channel or a non-anchor channel, the non-anchor channel being in an unlicensed band, transmission of the reference signals configured to frequency hop as indicated by the control information,
the reference signals for measurement by the UE for at least one of:
radio resource monitoring (RRM), or
in-sync or out-of-sync measurements,
wherein when the reference signals are for RRM, decode, from the UE, the measurements for mobility management, and
wherein when the reference signals are for the in-sync or out-of-sync measurements, decode, from the UE, a radio resource control (RRC) connection request when a counter in the UE that counts valid in- or out-of-sync indication has reached a predetermined threshold;
decode, from the UE, a Sounding Reference Signal (SRS) transmission on the non-anchor channel; and
encode, to the UE, uplink scheduling information for data transmission on the non-anchor channel by the UE the uplink scheduling information on the anchor channel and dependent on the SRS transmission; and
a memory configured to store the control information.

18. The apparatus of claim 17, wherein the processing circuitry is further arranged to encode at least one of:
a bitmap in a system information broadcast (SIB), the bitmap comprising a configuration indicating valid UL and DL subframes and updated timely dependent respectively on uplink and downlink traffic load, and higher layer signaling to the UE, the higher layer signaling comprising a parameter that indicates whether the SRS transmission is periodic or aperiodic, the SRS transmission limited to the valid UL subframes in the data channel and dropped if in the valid DL subframe, or
higher layer signaling that comprises a configuration indicating SRS periodicity and subframe offset for periodic or aperiodic SRS transmission, and when the SRS transmission is the aperiodic SRS transmission, a physical downlink control channel formed in accordance with downlink control information (DCI), the DCI indicating a trigger for the aperiodic SRS transmission.

19. A non-transitory computer-readable storage medium that stores instructions for execution by one or more processors of an enhanced Machine Type Communication (eMTC) user equipment (UE), the one or more processors to configure the UE to, when the instructions are executed:
  receive control information from an evolved NodeB (eNB) on an anchor channel, the anchor channel being in an unlicensed band, the control information comprising a uplink (UL) and downlink (DL) subframe configuration, the control information dependent on:
    whether the UE is configured for adaptive or non-adaptive frequency hopping and,
    when the UE is configured for adaptive frequency hopping, whether the UE is configured for listen-before-talk (LBT) adaptive frequency hopping;
  use the control information to receive reference signals on at least one of the anchor channel or a non-anchor channel, the non-anchor channel being in an unlicensed band; and
  measure the reference signals for at least one of:
    radio resource monitoring (RRM) or
    in-sync or out-of-sync measurements, and
  when the reference signals are for RRM, transmit the measurements to the eNB for mobility management, and
  when the reference signals are for the in-sync or out-of-sync measurements, determine from the in-sync or out-of-sync measurements whether an in- or out-of-sync indication is valid and start a counter in response to the valid in- or out-of-sync indication.

20. The medium of claim 19, wherein instructions, when executed, further configure the UE to:
  transmit a sounding reference signal (SRS) transmission the eNB on the non-anchor channel, the control information comprising subframe configuration and resource allocation for SRS transmission.

* * * * *